(12) United States Patent
Bartos et al.

(10) Patent No.: US 6,691,978 B1
(45) Date of Patent: Feb. 17, 2004

(54) CYLINDER COUPLING DEVICE

(75) Inventors: Josef A. Bartos, Pomona, CA (US); Harsharan Grewal, Diamond Bar, CA (US)

(73) Assignee: GAAP Gas Controls LLC, Pomona, CA (US)

( * ) Notice: Subject to any disclaimer, the term of this patent is extended or adjusted under 35 U.S.C. 154(b) by 50 days.

(21) Appl. No.: 10/223,788

(22) Filed: Aug. 21, 2002

(51) Int. Cl.[7] ............................................... F16K 31/44
(52) U.S. Cl. ...................................... 251/77; 251/149.6
(58) Field of Search .................. 251/149.6, 77, 251/149.1

(56) References Cited

U.S. PATENT DOCUMENTS

| | | | |
|---|---|---|---|
| 4,070,003 A | * 1/1978 | Shames et al. | .......... 251/149.6 |
| 5,330,155 A | 7/1994 | Lechner | |
| 5,445,358 A | * 8/1995 | Anderson | ................ 251/149.6 |
| 5,553,638 A | 9/1996 | Home | |
| 5,582,201 A | 12/1996 | Lee et al. | |
| 6,237,631 B1 | * 5/2001 | Giesler et al. | ........... 251/149.6 |

* cited by examiner

*Primary Examiner*—John Bastianelli
(74) *Attorney, Agent, or Firm*—Fay, Sharpe, Fagan, Minnich & McKee, LLP

(57) ABSTRACT

A valve insert is used to be mounted at least partially the outlet of a cylinder valve of a cylinder to allow a fluid to pass through the valve when a fluid connector is at least partially connected to the valve insert and/or the cylinder valve. The valve insert includes a body member adapted to be mount at least partially in the outlet of the cylinder valve; a valve member that moves in the body member, a docking member on the valve member adapted to contact at least a portion of the fluid connector and adapted to form a sealing relationship with the fluid connector; and a seal member that is movable by the valve member between an opened and a closed positioned.

78 Claims, 11 Drawing Sheets

CYLINDER COUPLING DEVICE

The present invention claims priority on U.S. Provisional Patent Application No. 60/307,589 filed Jul. 26, 2001 entitled "Cylinder Coupling Device," which is incorporated herein by reference. The present invention is related to the field of valves for household and/or recreational vehicle use and, more particularly, to an improved insert which is adapted to be mounted to the outlet end of an LPG cylinder valve to improve sealing with a separable male fitting.

BACKGROUND OF THE INVENTION

Gaseous fuels, such as butane and propane, have found a wide acceptance in household and/or recreational vehicle use. Such fuels are commonly used in association with gas grills, gas lamps, gas heaters, gas cutting torches, and other similar devices. When using such devices, an individual obtains a pressurized gas vessel or cylinder and then connects the vessel or cylinder to a gas consuming device. Typically, the gas consuming device operates at a pressure less than the gas pressure in the pressurized gas vessel or cylinder. As a result, a pressure regulator is mounted downstream of the valve on the pressurized gas vessel or cylinder to reduce the pressure of gas flowing through the valve and into the gas consuming device.

Presently, various safety regulations exist concerning the operation of the valve on the pressurized gas vessel or cylinder. As a result, several attempts have been made to minimize the escape or loss of gas when a gas consuming device is connected to and/or disconnected from the pressurized gas vessel or cylinder. In addition, gas escape or loss also occurs during the refilling of the gas vessel or cylinder. The most common cylinder valve insert is disclosed in U.S. Pat. No. 5,330,155 to Lechner, issued on Jul. 19, 1994. Another cylinder valve insert is disclosed in U.S. Pat. No. 5,553,638 to Home, issued on Sep. 10, 1996. Still another cylinder valve insert is disclosed in U.S. Pat. No. 5,582,201 to Lee, issued on Dec. 10, 1996. These three patents are incorporated herein by reference. These three cylinder valve inserts reduce the amount of gas escape or loss when a male connector is connected to the valve on the gas vessel or cylinder. However, these valve inserts still result in some gas escape or loss, especially after a male connector has been connected and disconnected several times from the gas vessel or cylinder.

The valve inserts of Lechner '155, Home '638 and Lee '201 are designed to be mounted to a standard cylinder valve. Each valve insert includes a tubular body a valve member and a seal mounted to the valve member. The valve member includes a docking member designed to form a seal with a nipple of a standard connection fitting. The valve member is biased by a valve member spring, thereby causing the valve member to resist movement when the nipple contacts the docking member. The valve member laterally moves in the tubular body as the nipple is further inserted into the tubular body. The lateral movement of the valve member causes the seal to move from a closed to an opened position, thereby allowing gas to flow between the connection fitting and the cylinder valve.

Home '638 is directed to an improvement over Lechner '155. Home '638 discloses a tubular member having L-shaped notches designed to mate with a wrench. The L-shaped notches are designed to simplify the insertion of the tubular body into cylinder valve. Home '638 also discloses that the valve member includes an abutment surface for engagement with a modified POL nipple. The modified POL nipple engages the docking member on the valve member in a manner to reduce gas from leaking between the POL nipple and the valve member. Home '638 discloses that the modifications to the valve member and the POL nipple overcome a problem associated with the valve insert disclosed in Lechner'155. Home '638 discloses that, after repeated use of the Lechner valve insert, the strength of the spring may weaken, resulting in the POL nipple not hermetically engaging the docking member prior to the seal moving to an opened position.

Although the arrangement disclosed in Home '638 may overcome a design shortcoming of Lechner '155, the redesigned valve member of Home '638 has its own shortcomings. The modified POL nipple is designed to contact and to abut a surface on the valve member to cause the valve member to move laterally. Prior to the valve moving, the contoured surfaces of the POL nipple form a seal with the docking member on the valve member. However, after continued use, the docking member will become compressed and/or become worn in certain regions. As a result, the end of the POL nipple will abut against the valve member and cause the seal to open prior to the POL nipple forming a seal with the docking member on the valve member, thereby resulting in gas escaping from the cylinder valve.

Lee '201 discloses a valve insert that is similar to the valve insert of Lechner '155 and Home '638. The valve insert has a spring positioned on the end of the seal instead of between the tubular body and valve member as shown in Lechner '155 and Home '638. Similar to the problems associated with the valve inserts of Lechner '155 and Home '638, after continued use, the docking member will become compressed and/or become worn in certain regions thereby, resulting in the seal being moved to the opened position prior to the POL nipple forming a seal with the docking member on the valve member.

In view of the disadvantages of present valve inserts, there is a continued demand for a valve insert that ensures adequate sealing with a separable male connection, and that will minimize the loss or escape of gaseous fuel when the cylinder is disconnected from and re-connected to the male connection.

SUMMARY OF THE INVENTION

The present invention is related to the field of valves, and more particularly to an improved insert which is adapted to be mounted to the outlet end of a cylinder valve to improve the sealing engagement with a separable male fitting. The invention is particularly directed to LPG cylinder valves for household and recreational vehicle use, and will be particularly described with reference thereto. However, the invention has broader applications and can be used in any type of fluid valve wherein the prevention of leaking or escaping fluid (e.g. gas and/or liquid) is desired. For instance, the improved insert can also be used in industrial applications (e.g., welding gas cylinders, oxygen cylinders for medical applications, shielding gas cylinders for welding, helium gas cylinders used to inflate objects, hydrogen fuel tanks, etc.).

In accordance with one aspect of the present invention, a cylinder valve such as, but not limited to, a LPG cylinder valve, includes a valve insert designed to reduce or prevent leakage of fluid from the cylinder valve when a fluid connector is connected to and/or disconnected from the cylinder valve. The valve insert can be removably or irremovably inserted in the cylinder valve. When the valve insert is removably inserted in the cylinder valve, the valve insert can be connected to the cylinder valve in a variety of manners such as, but not limited to, a threaded arrangement, a snap ring arrangement, a bolt or screw arrangement, a latch arrangement, spring clip arrangement, a clamp arrangement, and/or the like. When the valve insert is irremovably inserted in the cylinder valve, the valve insert can also or alternatively be connected to the cylinder valve in a variety of manners such as, but not limited to, gluing, welding, brazing, soldering, riveting and/or the like. Alternatively, the interior of the cylinder valve can be configured by molding, machining, or the like to integrally form one or more components of the valve insert in the cylinder valve.

In accordance with another and/or alternative aspect of the present invention, the valve insert is mounted as a unit on and/or in a cylinder valve outlet to selectively enable a flow of fluid therethrough when another fluid connector is sufficiently engaged therewith, and to substantially prevent such fluid flow,when the cylinder valve and the fluid connector are sufficiently separated from one another. The valve insert includes a body member, a valve member, a seal member, and a valve biasing member. The components of the valve insert can be made from a variety of materials such as, but not limited to, metal, ceramic, plastic and/or rubber (natural and/or synthetic). In one embodiment of the invention, the body member is adapted to be sealingly connected to the cylinder valve. In one aspect of this embodiment, the body member has a generally tubular or cylindrical shape having an outwardly-facing surface that engages the inner surface of the cylinder valve; however, the body member can have other shapes. In another and/or alternative aspect of this embodiment, the inner surface of the cylinder valve includes a threaded surface, and the outwardly-facing surface of the body member includes a threaded surface to enable the body member to be at least partially threaded in the cylinder valve. In still another and/or alternative aspect of this embodiment, the body member is fully inserted in the cylinder valve. In yet another and/or alternative aspect of this embodiment, only a portion of the body member is inserted in the cylinder valve. In another and/or alternative embodiment of the invention, the body member has an opening to allow fluid to flow therethrough. In still another and/or alternative embodiment of the invention, the body member has a seal seat facing toward the direction of fluid flow. In yet another and/or alternative embodiment of the invention, the body member has an abutment surface facing away from the direction of fluid flow. In a further and/or alternative embodiment of the invention, the body member has an inwardly-facing surface designed to at least partially contain one or more other components of the valve insert. In yet a further and/or alternative embodiment of the invention, the valve member is at least partially positioned in the body member for at least partial movement relative therein. In another and/or alternative embodiment of the invention, the front of the valve member includes a docking member adapted to engage a portion of the fluid connector. In one aspect of this embodiment, the fluid connector includes a POL nipple that at least partially engages the docking member as the fluid connector is connected to the cylinder valve. In still another and/or alternative embodiment of the invention, the rear of the valve member includes a seal contact surface. In yet another and/or alternative embodiment of the invention, the valve member includes an abutment surface that faces the body member abutment surface when the valve member is positioned in the body member. In yet another and/or alternative embodiment of the invention, the valve member includes an outwardly-facing surface configured to slidably engage the body member inwardly-facing surface. In another and/or alternative embodiment of the invention, the seal member is adapted to at least partially form a fluid seal with the seal seat of the body member. In one aspect of this embodiment, the seal member inhibits or prevents fluid from flowing through the valve insert when the seal member abuts against the seal seat. When the seal member moves away from the seal seat, the seal formed by the sealing member is broken to allow fluid to flow through the valve insert. In another and/or alternative aspect of this embodiment, the size of the fluid channel or orifice opening between the seal seat and the seal member is at least partially a function of the distance the seal member is positioned from the seal seat. In still yet another and/or alternative embodiment of the invention, the seal member moves independently from the valve member. In a further and/or alternative embodiment of the invention, the seal member is at least partially connected to the valve member. In still a further and/or alternative embodiment of the invention, the seal member includes an at least partially compressible material. In one aspect of this embodiment, the compressible part of the seal member is made of rubber and/or plastic having a hardness of at least about 50 durometer on a Shore "A" scale. In one particular design, the seal member has a hardness of about 85–95 durometer on a Shore "A" scale. In another and/or alternative embodiment of the invention, the seal contact surface of the valve member is at least partially designed to contact at least a portion of the seal member to cause the seal member to move away from the seal seat of the body member. In still another and/or alternative embodiment of the invention, the valve biasing member exerts a biasing force between the body member and valve member abutment surface. In one aspect of this embodiment, the valve biasing member causes the valve member to be continuously urged to move toward the front of the valve insert. In one particular design, such urging results in the seal contact surface of the valve member to be urged away from the seal member. In yet another and/or alternative embodiment of the invention, the valve biasing member includes a variety of members such as, but not limited to, one or more springs, an elastic material, a compressible material, a resilient material, fluid piston, shape memory alloy, and/or the like. In still another and/or alternative embodiment of the invention, the valve biasing member includes a compressible fluid.

In accordance with still another and/or alternative aspect of the present invention, the valve insert includes one or more sealing members to inhibit or prevent fluid leaks through the valve insert and/or to prevent foreign materials from interfering with the operation of one or more components of the valve insert. The sealing members can be a variety of different components such as, but not limited to, sealing rings, wiper seals, sealing fluids, gaskets, compressible inserts, and/or the like. Various types of sealing rings can be used such as, but not limited to, O-rings, quad rings, and/or the like. The sealing members can be made of a variety of materials such as, but not limited to, rubber and/or plastic. The hardness and/or durability of the sealing members can be same or different from one another, when two or more sealing members are used. Generally, the hardness of the sealing members is at least about 30–40 durometer on a Shore "A" scale. Typically, the hardness of the sealing members is at least about 50 durometer on a Shore "A" scale; however, other durometer values can be used. In one embodiment of the invention, the surfaces between the body member and the valve member include one or more sealing members. In one aspect of this embodiment, the surfaces between the body member and the valve member include at least one sealing ring. In another and/or alternative aspect of this embodiment, the surfaces between the body member and the valve member include a lubricant that at least partially functions as a sealing fluid. The lubricant can also facilitate in non-sticking movement of the surfaces of the body member and the valve member. In still another and/or alternative aspect of this embodiment, the surfaces between the body member and the valve member include at least one sealing ring and a lubricant. The lubricant facilitates in non-sticking movement of the surfaces of the body member and the valve member, and/or the surfaces of the body member and/or valve member over and/or about the sealing ring. In one particular configuration of this aspect, at least one sealing ring is a quad seal ring. The design of the quad seal ring allows for lubricant to be at least partially maintained between the cavities of the quad seal ring, thereby continuously lubricating the surfaces between the body member and/or the valve member when the valve member moves. In another and/or alternative particular configuration of this aspect, the quad seal ring has a four lobed cross-sectional shape which includes a recess between two adjacent lobes. A lubricant, if used, is typically applied to the surfaces of the quad seal ring. The recesses of the quad seal ring trap a portion of the lubricant, thereby lubricating the surfaces facing the body member and the valve member each time the valve member moves within the body member. The lubricated surfaces inhibit or prevent sticking of the valve member in the body member. In still another and/or alternative aspect of this embodiment, at least one sealing member is affixed to the valve member so as to move with the valve member. In still yet another and/or alternative aspect of this embodiment, at least one sealing member is affixed to the body member so as to remain substantially stationary when the valve member moves within the body member. In a further and/or alternative aspect of this embodiment, the surfaces between the body member and the valve member include at least two sealing members which are spaced apart. In one particular configuration of this aspect, the at least two sealing members include a sealing ring, wiper seal, and/or the like. In one specific design of this configuration, the surfaces between the body member and the valve member include a sealing ring and a wiper seal. The sealing ring and wiper seal can be affixed to the valve member and/or the body member. It is not necessary for both the sealing ring and wiper seal to be affixed to the same member. The combination sealing ring and wiper seal facilitates in limiting the amount of foreign material that deposits between the valve member and the body member. The combination sealing ring and wiper seal also facilitates in maintaining lubricant, if used, between the sealing ring and/or the wiper seal. In another and/or alternative specific design of this configuration, the wiper ring includes a nub that is at least partially adapted to contact one or moving surfaces of the valve member. In still another and/or alternative specific design of this configuration, the wiper ring is inserted at or closely adjacent to the front end of the body member. In yet another and/or alternative specific design of this configuration, the wiper ring is vulcanized to the body member; however, the wiper ring can be attached to the body member or valve member in other manners. The wiper ring inhibits or prevents foreign materials from settling between the valve member and the body member to inhibit or prevent sticking of the valve member or inhibit or prevent restriction of movement of the valve member within the body member. The wiper ring also or alternatively facilities in removing foreign material that has settled between the valve member and the body member when the valve member moves within the body member. The wiper ring further or alternatively inhibits or prevents lubricant from escaping between the wiper ring and the quad seal ring, thereby facilitating in ensuring proper and continued lubrication.

In accordance with yet another and/or alternative aspect of the present invention, the valve insert includes a seal biasing member. The seal biasing member at least partially causes the seal member to be urged toward the seal seat of the body member. In one embodiment of the invention, the seal biasing member causes the seal member to move toward the seal seat of the body member and into the closed position when the fluid connector is not connected to the fluid valve. The seal biasing member can include a variety of members such as, but not limited to, one or more springs, an elastic material, a compressible material, a resilient material, fluid piston, shape memory alloy, and/or the like. In another and/or alternative embodiment of the invention, the seal biasing member is positioned in the cylinder valve such that the seal biasing member is at least partially compressed between the seal member and at least one surface of the cylinder valve. In still another and/or alternative embodiment, the seal biasing member is at least partially connected to the seal member and/or the cylinder valve. In yet another and/or alternative embodiment of the invention, the seal biasing member continuously urges the seal member toward the seal seat of the body member.

In accordance with yet another and/or alternative aspect of the present invention, at least a portion of the valve member travels a distance in the body member prior to the seal contact surface of the valve member contacting the seal member. This valve member and seal member arrangement facilitates in the formation of a sealing engagement between the valve member and the fluid connector prior to moving the seal member away from the seal seat of the body member. In one embodiment of the invention, the docking arrangement on the valve member includes one or more sealing arrangements to form a sealing engagement with at least portion of the fluid connector. In one aspect of this embodiment, the fluid connector includes a POL nipple. The front and/or sides of the POL nipple contact the docking member, resulting in the one or more sealing arrangements on the docking member at least partially forming a seal with the POL nipple as the fluid connector is connected to the cylinder valve. The one or more sealing arrangements can include a variety of materials such as, but not limited to, rubber and/or plastic. Generally, at least a portion of the one or more sealing arrangements is compressible. The valve biasing member causes the valve member to resist movement in the body member as the fluid connector is forced into contact with the docking member of the valve member. When the fluid connector includes a POL nipple, the POL nipple typically engages the docking member of the valve member. The countering force of the valve biasing member at least partially causes a sealing engagement to be formed and maintained between the fluid connector and the docking member prior to the seal contact surface of the valve member causing the seal member to be moved off the seal seat of the body member. As can be appreciated, even after the docking member becomes worn after the fluid connector has been repeatedly connected and disconnected from the cylinder valve, the biased valve member, in combination with the travel distance of the valve member prior to contacting the seal member, facilitates in ensuring that a sealing engagement is formed between the docking member on the valve member and the fluid connector prior to the movement of the seal member being moved to opened position by the seal contact surface of the valve member. The sealing engagement between the docking member of the valve member and the fluid connector ia further ensured by the pressure of the fluid acting on the seal member and urging the seal member to remain in the closed position. This added force requires at least a portion of the fluid connector to further be engaged with the docking member to overcome this fluid force. When a seal biasing member is used in the valve insert, the seal biasing member also continuously resists the seal member being moved off the seal seat of the body member to an opened position. This added force by the seal biasing member further ensures that a sealing engagement is maintained between the docking member and fluid connector while the seal member is in an opened position.

In accordance with a further and/or alternative aspect of the present invention, the valve insert is designed such that when the seal member is moved off the seal seat of the body member and to an opened position, a pressure differential across the valve will cause a tighter sealing engagement to form between the docking member and the fluid connector.

In accordance with yet a further and/or alternative aspect of the present invention, the cylinder valve includes a coupling arrangement to secure a fluid connector to the cylinder valve. In one embodiment of the invention, the outer surface of the cylinder valve includes a threaded section that allows the fluid connector to be threaded to the cylinder valve. In another and/or alternative embodiment of the invention, the coupling arrangement and the fluid connection form at least a partial seal prior to the sealing member moving off the seal seat of the body member to an open position, and/or after the sealing member has moved back onto the seal seat to a closed position. The partial seal limits or prevents fluid from escaping even if a fill sealing arrangement between the nipple of the fluid connector and docking member is not fully formed. In still another and/or alternative embodiment of the invention, the coupling arrangement includes one or more sealing arrangements.

The principal object of the present invention is to provide an insert for a cylinder valve which reduces the leakage or escape of gas when a fluid connector is connected to and/or disconnected from the cylinder valve.

Another and/or alternative objective of the present invention is to provide a valve insert that is simple to use and has a longer use-life.

Still another and/or alternative objective of the present invention is to provide a valve insert that insures adequate sealing with a separable male connection.

Yet another and/or alternative objective of the present invention is to provide a valve insert that minimizes the loss or escape of gaseous fuel when the cylinder is disconnected and reconnected to the male connection.

Still yet another and/or alternative objective of the present invention is to provide a valve insert that can be used with existing cylinder valve designs.

A further and/or alternative objective of the present invention is to provide a valve insert that can be used on LPG cylinder valves.

Still a further and/or alternative objective of the present invention is to provide a valve insert that can be removably inserted in a cylinder valve.

Still yet a further and/or alternative objective of the present invention is to provide a valve insert that can form a seal with a male connector having a POL nipple.

Another and/or alternative objective of the present invention is to provide a valve insert that can form a seal with a male connector and travels a distance prior to allowing a fluid to pass through the valve insert.

Still another and/or alternative objective of the present invention is to provide a valve insert that is biased in a closed position.

Yet another and/or alternative objective of the present invention is to provide a valve insert that forms a tighter sealing arrangement with a fluid connector due to a pressure differential across the valve insert when the valve insert is in an opened position.

Still yet another and/or alternative objective of the present invention is to provide a valve insert that is simple and cost effective to manufacture.

These and other objects and advantages will become apparent to those skilled in the art upon the reading and following of this description taken together with the accompanying drawings.

BRIEF DESCRIPTION OF THE DRAWINGS

Reference may now be made to the drawings, which illustrate various embodiments that the invention may take in physical form and in certain parts and arrangements of parts wherein;

FIG. 7A is an enlarged partial view of FIG. 7 showing an alternative configuration of the valve insert;

DETAILED DESCRIPTION OF THE PREFERRED EMBODIMENTS

Figure 1:
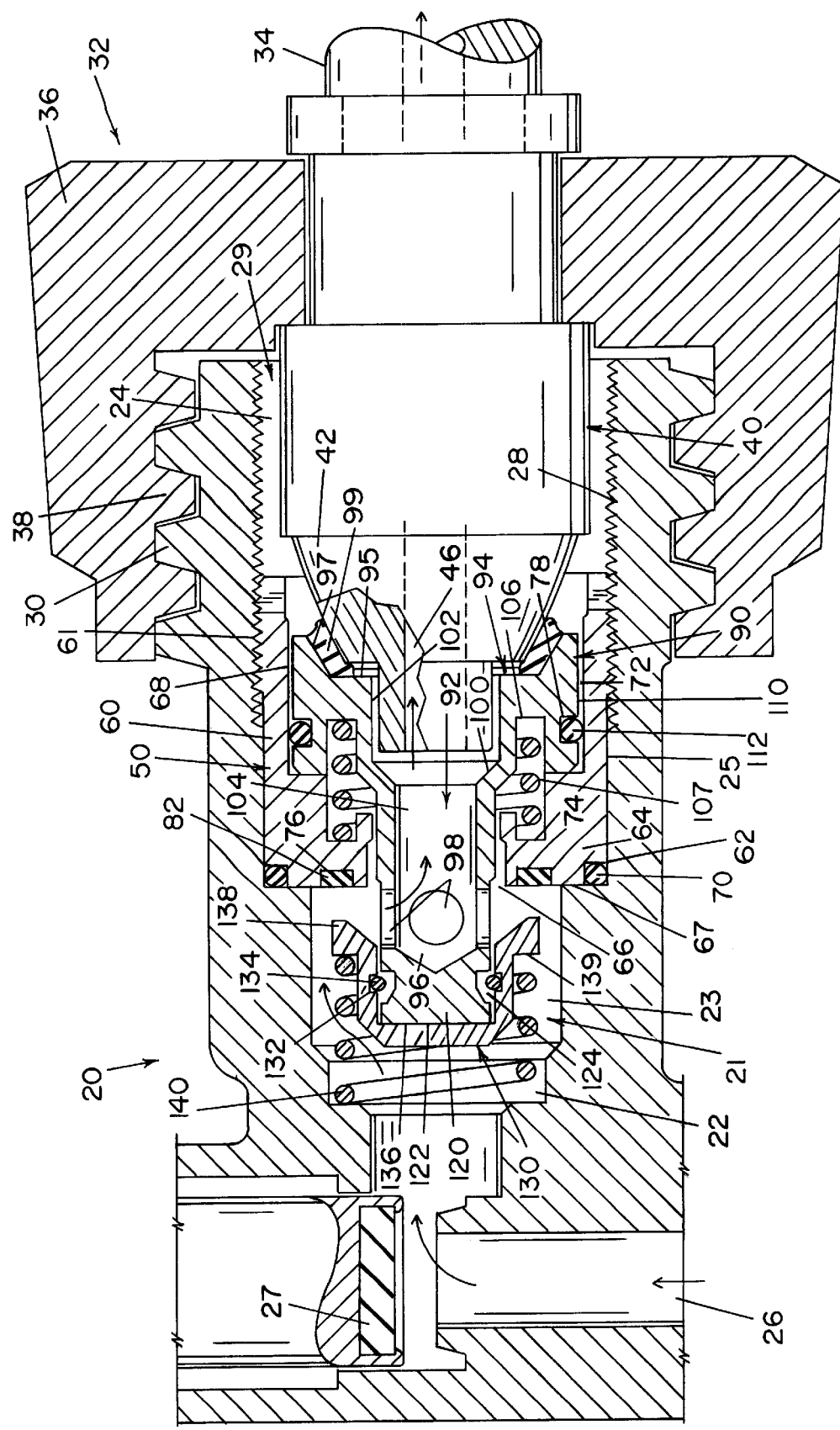
FIG. 1 is an elevational, cross-sectional view showing a valve insert in accordance with the present invention mounted in a cylinder valve outlet and a male fitting connected to the cylinder valve and engaging the valve insert.
Figure 2:
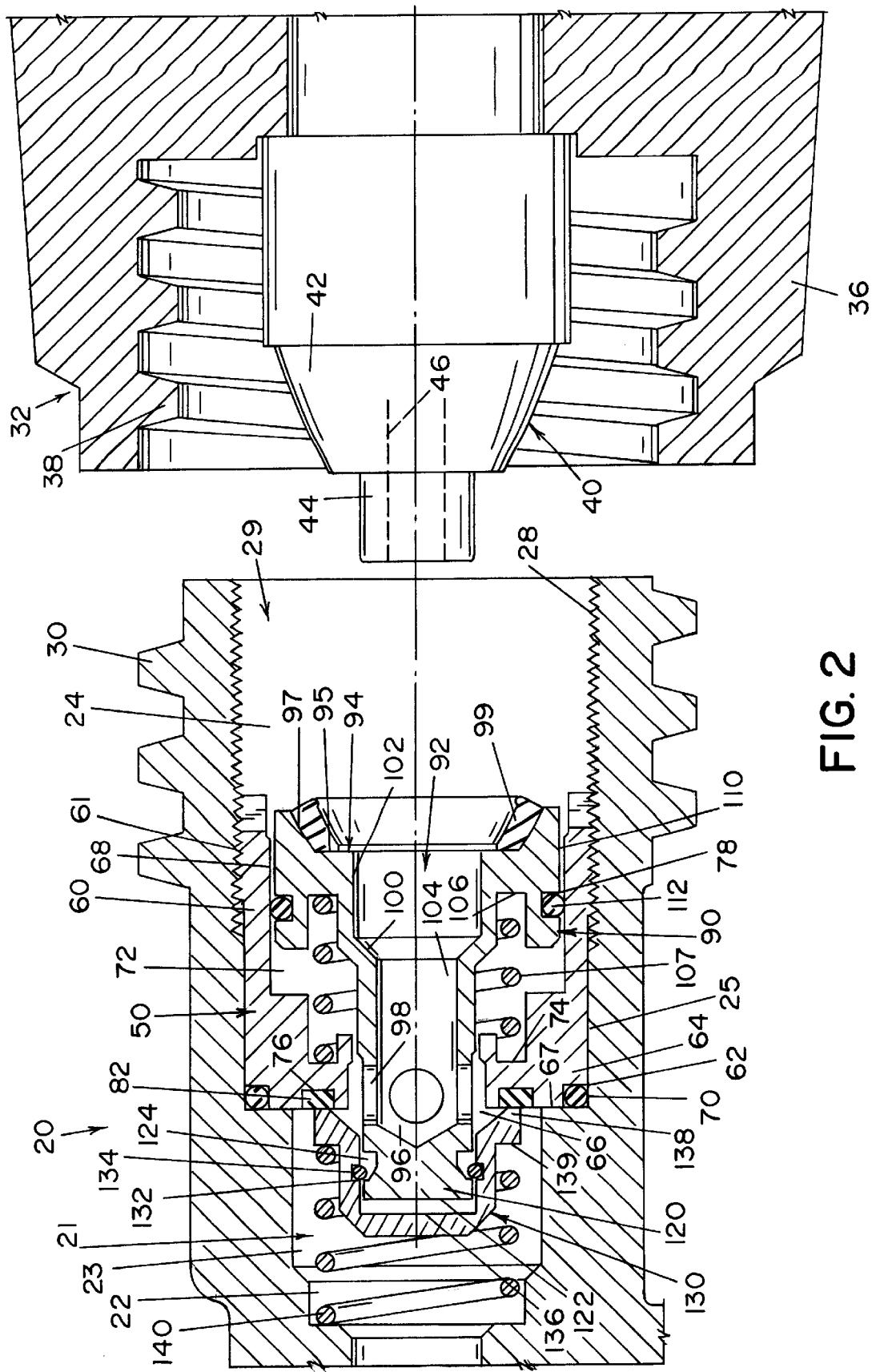
FIG. 2 is an enlarged partial view of FIG. 1 showing the male fitting disengaged from the cylinder valve.

Referring now to the drawings, wherein the showings are for the purpose of illustrating the preferred embodiments of the invention only and not for the purpose of limiting the same, FIGS. 1–4 disclose one embodiment of the improved valve insert of the present invention. Referring to FIGS. 1 and 2, a cylinder valve 20 is a standard valve that is connected to a fluid source such as on a LPG cylinder. The cylinder valve includes an inner chamber 21 that is adapted to receive at least a portion of valve insert 50 of the present invention. The valve inner chamber 21 includes three sub-chambers 22,23,24, each having a substantially cylindrical shape and a different diameter. The cylinder valve includes a fluid conduit 26 for fluid to travel from the fluid source and into the valve chamber. A valve 27 is provided to allow or prevent fluid from flowing from fluid conduit 26 into valve chamber 21. Typically, valve 27 is a manually turned valve; however, other valves can be used. Cylinder valve 20 includes threadings 28 on a portion of the interior surface sub-chamber 25. The threadings are used to at least partially secure valve insert 50 in valve chamber 21. The cylinder has an outer threaded portion 30 surrounding an opened end 29 of the cylinder valve. The threaded portion 30 is used to matingly engage with an inner threaded portion 38 of a housing 36 of a male fitting 32. The male fitting is typically secured to a hose 34 that provides fluid to an apparatus such as, but not limited to a gas grill, a gas stove, a gas oven, a gas fire place, a gas lamp, etc. The male fitting includes a nipple 40, such as a POL nipple, having an arcuate side face 42, a cylindrically shaped front end face 44 and a conduit 46. Housing 36 is designed to rotate about the POL nipple to secure and release the male fitting to and from the cylinder valve. As described so far, all the components of the cylinder valve and the male fitting are common in the art, thus further description of such components and operation of such components will not be further described herein. As can further be appreciated, other cylinder valve designs and male fittings could be used, and the valve insert of the present invention is envisioned as being used in such other designs.

Valve insert 50 includes a body member 60 which has an outer threaded portion 61 for threadedly engaging with threadings 28 in the inner surface of sub-chamber 25 of the cylinder valve. An O-ring 70 is positioned in seal slot 62 in the body member 60. O-ring 70 surrounds an outer periphery of the body member 60 to enhance the sealing engagement between the cylinder valve and the body member. Body member 60 includes a base portion 64 having an opening 66 therethrough. The base portion 64 has an outer surface that defines a seal seat 67 against which a sealing member 130 can be seated. Body member 60 also includes a valve cavity 72, wherein a valve member 90 can move therein. Facing opposite the seal seat on base portion 64 is a biasing abutment 74. The seal seat 67 includes a sealing recess 76 which receives a sealing ring 82.

Valve member 90 is at least partially positioned within body member 60. Valve member 90 is slidably positioned in valve cavity 72 of body member 60. A lubricant can be used to facilitate the movement of the valve member in the body member. Valve member 90 includes a central cavity 92 along the longitudinal axis of the valve member. The central cavity begins at docking abutment 94 and terminates at cavity end 96. Positioned adjacent to cavity end 96 are at least one side openings 98. Central cavity 92 includes a tapered edge 100 positioned between docking abutment 94 and cavity end 96. The tapered edge defines the narrowing of the central cavity and divides the cavity between a wider posterior portion 102 and a narrower anterior portion 104. Valve member 90 also includes a biasing abutment surface 106 that faces the flow of the fluid though the valve member. An indent 78 is positioned on the outwardly facing surface 110 of valve member 90. Indent 78 is designed to retain an O-ring 112 to form a sealing arrangement between the outwardly facing surface of the valve member and the inwardly facing surface 68 of the body member. The O-ring facilitates in forming a seal between valve member 90 and body member 60.

Docking abutment 94 includes two faces 95 and 97. Faces 95 and 97 form an angle greater than 90° between the two faces. Face 97 flares outwardly and is adapted to receive nipple 40. A portion of faces 95 and 97 includes a resilient sealer 99 that forms a seal with the nipple when the nipple engages the docking abutment.

Positioned between biasing abutment 74 of the body member and biasing abutment surface 106 of the valve member is a valve biasing member such as spring 107 which continuously urges biasing abutment surface 106 away from biasing abutment 74. The valve biasing member causes the valve member to resist movement in the body member when nipple 40 engages the docking member on the valve member.

Valve member 90 has an anterior portion 120 which includes a seal abutment surface 122. Anterior portion 120 includes a retaining slot 124. Seal abutment 122 is adapted to engage a seal abutment surface 136 of sealing member 130. Sealing member 130 includes a slot 132 which contains a retaining ring 134 Sealing member 130 includes a seal end 138 adapted to engage sealing ring 82 on the base portion of body member 60 to substantially prevent fluid from passing through the valve insert.

When male fitting 32 is separated from the cylinder valve, the valve biasing member 107 exerts a force on valve member 90, thereby urging biasing abutment surface 106 to move away from biasing abutment 74. This arrangement is shown in FIG. 2, wherein sealing member 130 is in the closed position. The valve member in this position causes seal end 138 of sealing member 130 to engage sealing ring 82. Sealing member 130 is moved and held in the closed position by retaining slot 124 on valve member 90 engaging retaining ring 134. Retaining ring 134 also limits the movement of the valve member in the body member. In the closed position, fluid is prevented from flowing through the valve insert.

Figure 3:
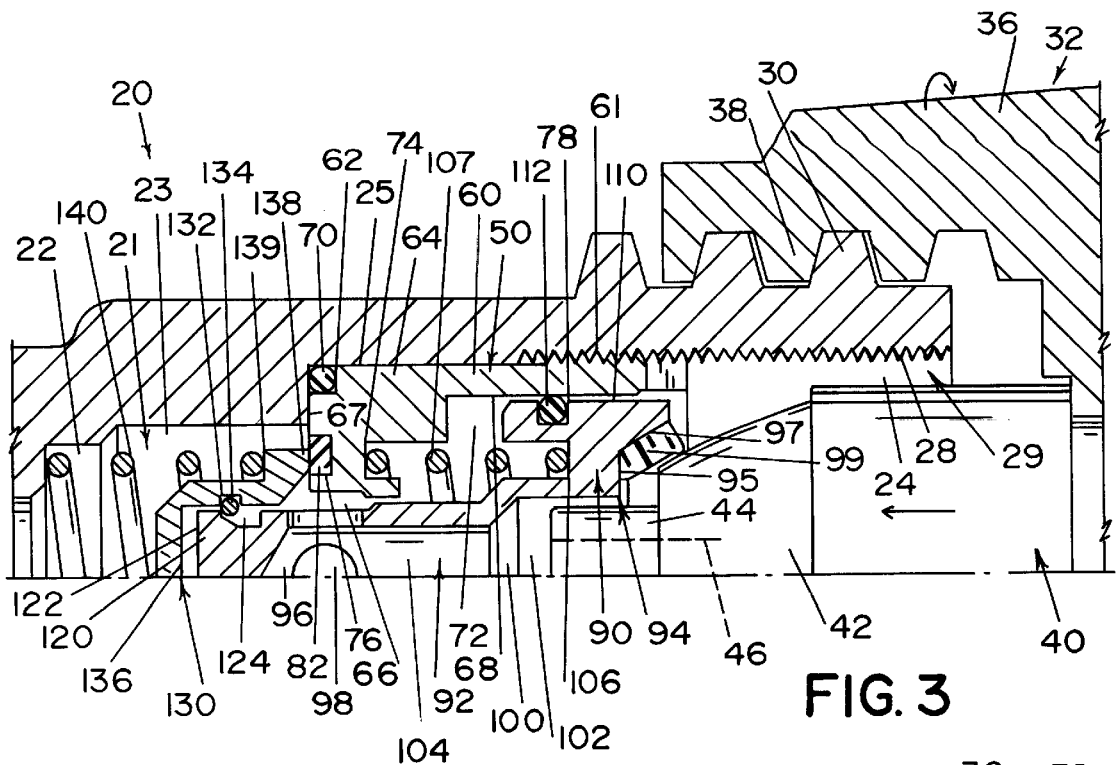
FIG. 3 is an enlarged partial view of FIG. 1 showing a portion of the male fitting initially contacting the valve insert.
Figure 4:
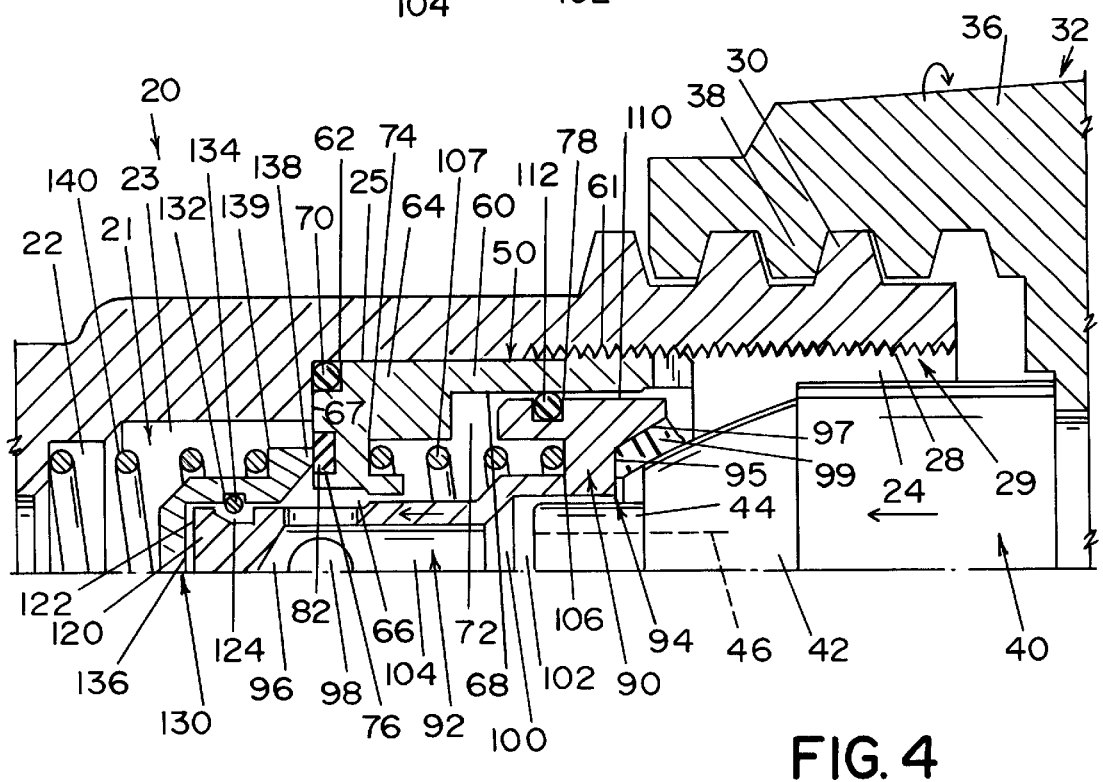
FIG. 4 is an enlarged partial view of FIG. 1 showing a portion of the male fitting contacting and moving the valve insert into an open position.

As shown in FIGS. 1, 3 and 4, the threaded portion 24 of the cylinder valve matingly engages with the inner threaded portion 38 of a male fitting 32 resulting in nipple 40 engaging docking abutment 94 of valve member 90. When male fitting 32 is screwed onto the cylinder valve, the arcuate side face 42 of nipple 40 hermetically engages resilient sealer 99 on faces 95 and 97 of docking abutment 94. As nipple 40 is continually moved into the body member, the valve biasing member continuously exerts a force on the valve member to cause the valve member to resist movement in the body member. This resistance of movement of the valve member causes a seal to be formed and maintained between the nipple and the docking member. As the nipple continues to move into the body member, the force exerted on the valve member becomes greater than the opposing force of the valve biasing member resulting in the valve member being moved laterally in the body member. The size of retaining slot 124 is such that the valve member moves laterally a defined distance before seal abutment surface 122 engages seal abutment surface 136 of sealing member 130.

As can be appreciated, slot 124 can be sized to engage or not engage the retaining ring at the same time the seal abutment surface 122 engages seal abutment surface 136 of sealing member 130. The fluid pressure, if any, on the front face of the sealing member initially causes the sealing member to resist being moved off sealing ring 82. The sealing member is also biased in the closed position by a seal biasing member such as spring 140. Spring 140 is positioned between the back wall of sub-chamber 25 and biasing landing 139 on sealing member 130. As the nipple continues to be moved into the body member, the counteracting force of the fluid on the sealing member, if any, and by spring 140 are overcome and the seal member moves off sealing ring 82 to allow fluid to flow through the valve insert as indicated by the arrows in FIG. 1. As a result of the operation of the valve member, significantly less fluid escapes from cylinder valve 20 as the male fitting 32 is connected to the cylinder valve.

The valve insert of the present invention also reduces the amount of fluid escape between cylinder valve 20 and male fitting 32 as the male fitting is removed from the cylinder valve. The male fitting is removed from the cylinder valve by turning housing 36 so as to unthread the housing from threadings 30 on the cylinder valve. As housing 36 is unthreaded from outer threaded portion 30, nipple 40 begins to move toward open end 29 of the cylinder valve. This receding movement of nipple 40 reduces the force being applied to the valve insert. As a result, the force exerted by spring 140 begins to move sealing member 130 toward seal seat 67 until seal end 138 engages sealing ring 82 to form a seal between the sealing member and valve insert, thus terminating the flow of fluid through the valve insert. In practice, spring 140 exerts a larger biasing force than spring 107. As a result, the sealing member forms a seal with little, if any, force being reduce between nipple 40 and docking abutment 94, thereby reducing the occurrence of fluid escape between the nipple and docking member prior to the sealing member forming a seal with the valve insert. As the housing of male fitting 32 is continually turned, nipple 40 further retracts, thereby causing the valve member 90 to retract in body member 60 as a result of the biasing force applied by spring 107. The seal between docking abutment 94 and the nipple is substantially maintained until the valve member fully retracts in the body member. Thereafter, the nipple pulls away from the docking member and the male fitting is removed from the cylinder valve. The resulting connection and disconnection procedure results in significant reductions in the amount of fluid loss.

Figure 5:
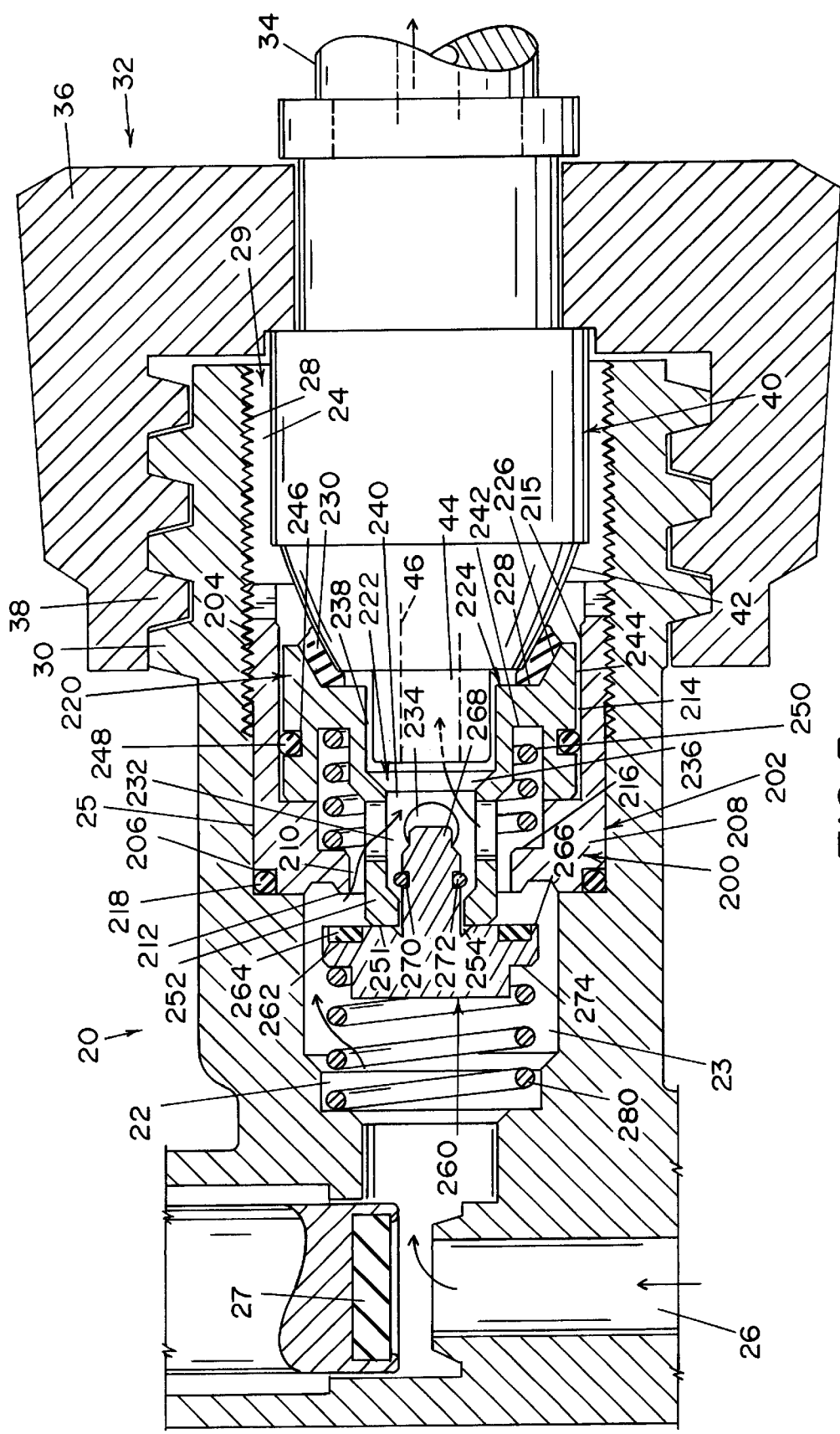
FIG. 5 is an elevational, cross-sectional view showing an alternative valve insert in accordance with the present invention mounted in a cylinder valve outlet and a male fitting connected to the cylinder valve and engaging the valve insert.
Figure 6:
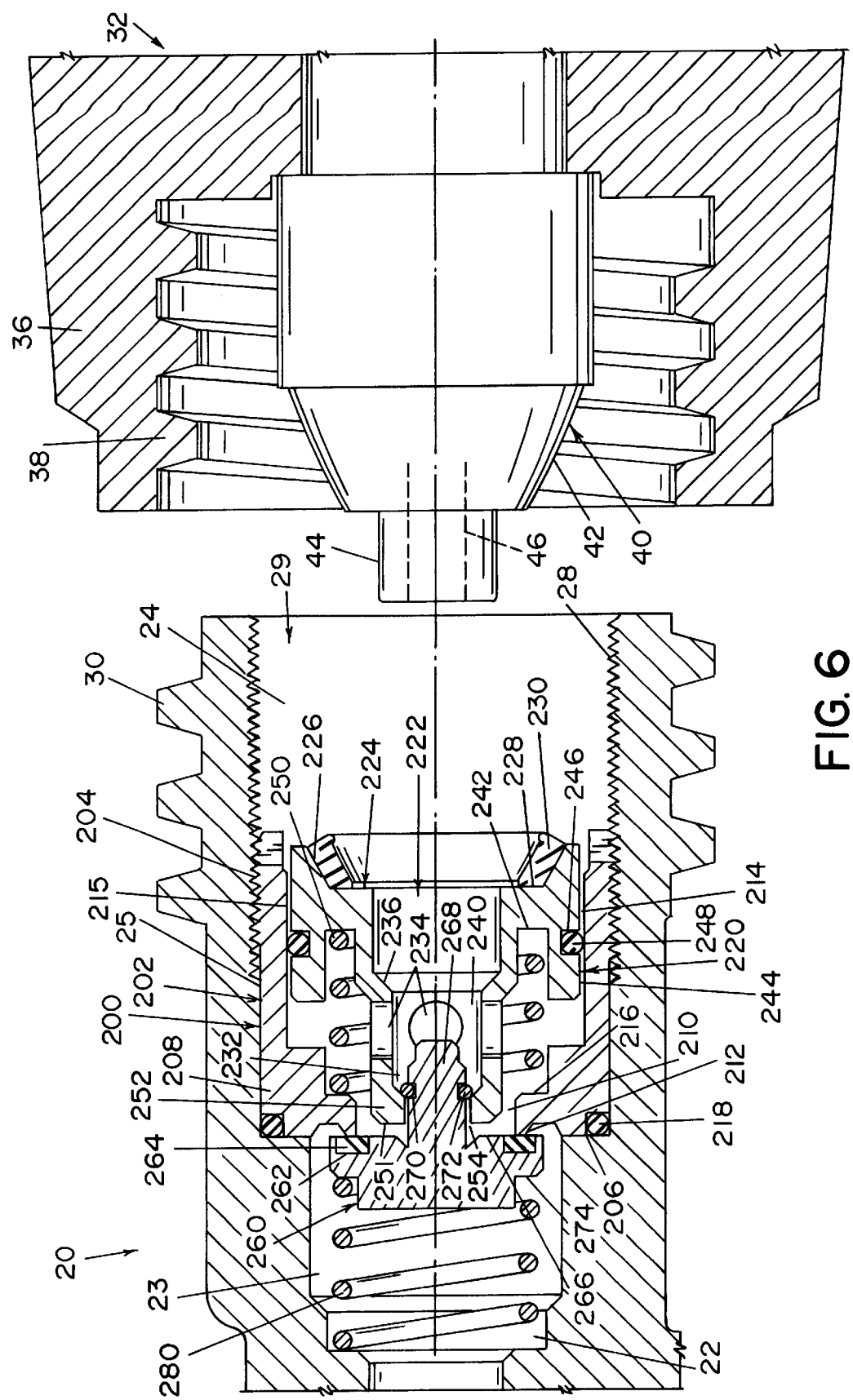
FIG. 6 is an enlarged partial view of FIG. 5 showing the male fitting disengaged from the cylinder valve.

Referring now to FIGS. 5 and 6, an alternative design of the valve insert is disclosed. The basic design of the valve insert is the same as shown in FIGS. 1–4. The design of the male fitting 32 and the cylinder valve 20 remain the same, thus the operation and detailed description of the cylinder valve and male fitting will not be repeated. In addition, similar numbering will be used to refer to the cylinder valve and male fitting as used in FIGS. 1 and 2. Valve insert 200 includes a body member 202 which has an outer threaded portion 204 for threadedly engaging with threadings 28 in the inner surface of sub-chamber 25 of the cylinder valve. An O-ring 218 is positioned in seal slot 206 in body member 202. O-ring 218 surrounds an outer periphery of the body member 202 to enhance the sealing engagement between the cylinder valve and the body member. Body member 202 includes a base portion 208 having an opening 210 therethrough. The base portion 208 has an outer surface that defines a seal seat 212 against which a sealing member 260 can be seated. Body member 202 also includes a valve cavity 214, wherein a valve member 220 can move therein. Facing opposite the seal seat on base portion 208 is a biasing abutment 216.

Valve member 220 is at least partially positioned within body member 202. Valve member 220 is slidably positioned in valve cavity 214 of body member 202. A lubricant can be used to facilitate the movement of the valve member in the body member. Valve member 220 includes a central cavity 222 along the longitudinal axis of the valve member. The central cavity begins at docking abutment 224 and terminates at cavity end 232. Positioned adjacent to cavity end 232 are at least one side openings 234. Central cavity 222 includes a tapered edge 236 positioned between docking abutment 224 and cavity end 232. The tapered edge defines the narrowing of the central cavity and divides the cavity between a wider posterior portion 238 and a narrower anterior portion 240. Valve member 220 also includes a biasing abutment surface 242 that faces the flow of the fluid though the valve member. An indent 246 is positioned on the outwardly facing surface 244 of valve member 220. Indent 246 is designed to retain an O-ring 248 to form a sealing arrangement between the outwardly facing surface of the valve member and the inwardly facing surface 215 of the body member. The O-ring facilitates in forming a seal between valve member 220 and body member 202.

Docking abutment 224 includes two faces 226 and 228. Faces 226 and 228 form an angle greater than 90° between the two faces. Face 226 flares outwardly and is adapted to receive nipple 40. A portion of faces 226 and 228 includes a resilient sealer 230 that forms a seal with the nipple when the nipple engages docking abutment.

Positioned between biasing abutment 216 of the body member and biasing abutment surface 242 of the valve member is a valve biasing member such as spring 250 which continuously urges biasing abutment surface 242 away from biasing abutment 216. The valve biasing member causes the valve member to resist movement in the body member when nipple 40 engages the docking member on the valve member. Valve member 220 has an anterior portion 252 which includes an opening 254 adapted to receive a portion of sealing member 260.

Sealing member 260 includes a slot 262 that retains a sealing ring 264. Sealing member 260 also includes a seal finger 268 which extends from seal abutment surface 266 and through opening 254 of valve member 220. Seal finger 268 includes a slot 270 that retains a retaining ring 272. Sealing member 260 also includes a biasing seat 274 that is adapted to receive one end of seal spring 280.

The operation of the valve insert disclosed in FIGS. 5 and 6 is similar to the valve insert shown in FIGS. 1 and 2. When male fitting 32 is separated from the cylinder valve, spring 250 exerts a force on valve member 220 thereby urging the biasing abutment surface to move away from biasing abutment as shown in FIG. 6. The valve member in this position results in sealing abutment surface 251 moving off of abutment surface 266 of sealing member 260 thereby allowing sealing ring 264 to form a seal with seal seat 212. Spring 280, positioned between the back wall of sub-chamber 22 and biasing seat 274 on sealing member 260, continuously urges sealing member 260 into engagement with seal seat 212 of body member 202 thereby forming a sealing arrangement between sealing ring 264 on the sealing member and seal seat 212 on the body member. The sealing arrangement between sealing ring 264 and seal seat 212 prevents fluid from flowing through the valve insert. Retaining ring 272 limits the movement of the valve member in the body member.

As shown in FIG. 5, the threaded portion 30 of the cylinder valve matingly engages with the inner threaded portion 38 of a male fitting 32 resulting in nipple 40 engaging docking abutment 224 of valve member 220. When male fitting 32 is screwed onto the cylinder valve, the arcuate side face 42 of nipple 40 hermetically engages resilient sealer 230 on faces 226 and 228 of the docking member. As nipple 40 is continually moved into the body member, spring 250 continuously exerts a force on the valve member to cause the valve member to resist movement in the body member. This resistance of movement of the valve member causes a seal to be formed and maintained between the nipple and the docking member. As the nipple continues to move into the body member, the force exerted on the valve member becomes greater than the opposing force of the spring, resulting in the valve member beginning to move axially in the body member. As shown in FIG. 6, seal abutment surface 251 is spaced from seal abutment surface 266 of sealing member 260. As a result, the valve member travels a defined distance axially before seal abutment surface 251 contacts seal abutment surface 266. During this movement of the valve member, the compression of spring 250 increases the counter moving force of the valve member, thereby ensuring that a seal is maintained between the nipple and the docking member. Once seal abutment surface 251 contacts seal abutment surface 266, further movement of valve member 220 is resisted by the biasing force acting on sealing member 260 by seal spring 280 and the fluid pressure acting of the sealing member. As the nipple continues to be moved into the body member, the counteracting force of seal spring 280 and the fluid pressure, if any, on the sealing member are overcome and the seal member moves off seal seat 212 to allow fluid to flow through the valve insert.

When male fitting 32 is unscrewed from the cylinder valve, and the nipple is moved out of the body member, the sealing arrangement between the nipple and the docking member is maintained by the biasing forces of both springs 280 and 250. As the valve member moves to its initial position, spring 280 causes the sealing member to move to the closed position. Once the sealing ring 264 contacts seal seat 212 and prevents fluid from flowing through the valve insert, the valve member continues to move to its initial position, and the sealing arrangement between the nipple and docking member is maintained by spring 250 until the nipple is retracted off the docking member. In this valve insert arrangement, the sealing arrangement between the nipple and the docking member is maintained before and after the sealing ring 264 is moved off of or moved on to seal seat 212 sa result, the sealing member form a seal with little, if any, force being reduced between nipple 40 and docking abutment 224, thereby reducing the occurrence of fluid escape between the nipple and docking member prior to the sealing member forming a seal with the valve insert.

When male fitting 32 is separated from the cylinder valve, spring 250 exerts a force on valve member 220 thereby urging biasing abutment surface 242 to move away from biasing abutment 216. This arrangement is shown in FIG. 6, wherein sealing member 260 is in the closed position. The valve member in this position causes seal ring 264 on seal abutment surface 266 to engage seal abutment surface 251. Sealing member 260 is moved and held in the closed position by the ends of anterior portion 252 engaging retaining ring 272 on seal finger 268 of sealing member 260. As a result of the operation of the valve member, significantly less fluid escapes from cylinder valve 20 as the male fitting 32 is connected to the cylinder valve. The valve insert of the present invention also reduces the amount of fluid escape between cylinder valve 20 and male fitting 32 as the male fitting is removed from the cylinder valve.

Figure 7:
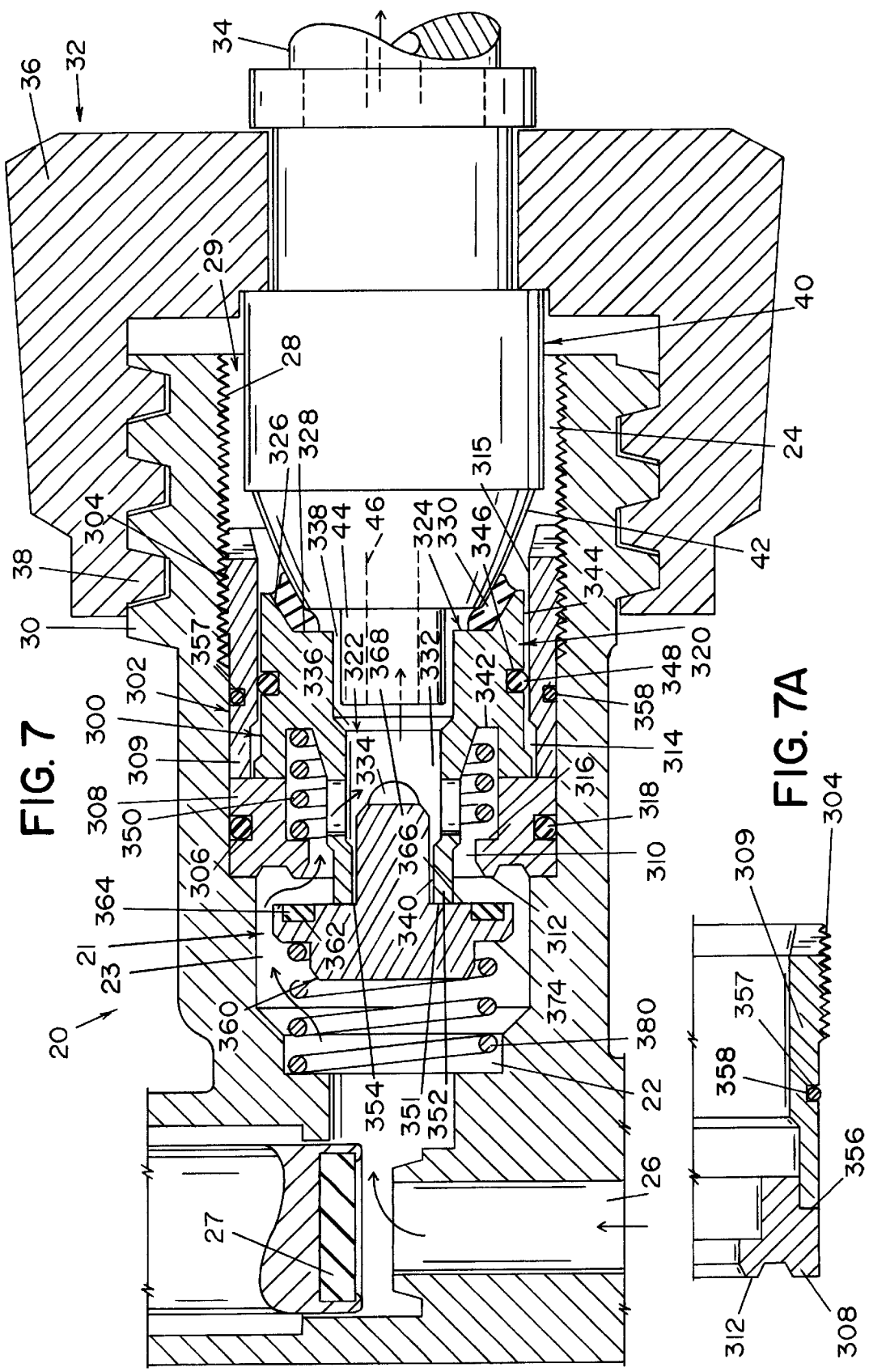
FIG. 7 is an elevational, cross-sectional view showing another alternative valve insert in accordance with the present invention mounted in a cylinder valve outlet and a male fitting connected to the cylinder valve and engaging the valve insert.
Figure 8:
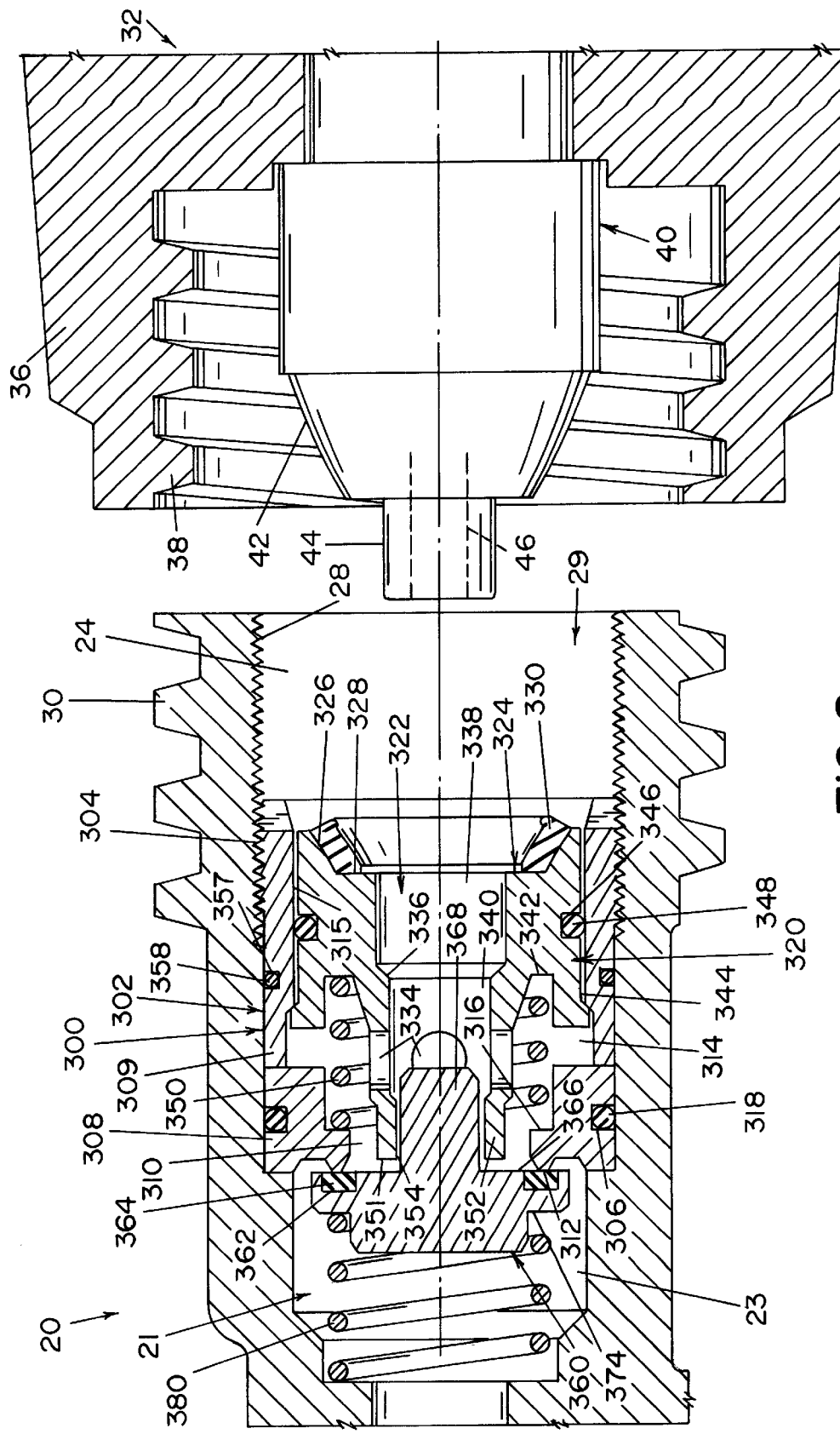
FIG. 8 is an enlarged partial view of FIG. 7 showing the male fitting disengaged from the cylinder valve.

Referring now to FIGS. 7 and 8, an alternative design of the valve insert is disclosed. The basic design of the valve insert is the same as shown in FIGS. 5 and 6. The design of the male fitting 32 and the cylinder valve 20 remain the same, thus the operation and detailed description of the cylinder valve and male fitting will not be repeated. In addition, similar numbering will be used to refer to the cylinder valve and male fitting as used in FIGS. 1, 2, 5 and 6. Valve insert 300 includes a body member 302 forming an anterior base portion 308 and a posterior base portion 309. The front end of posterior base portion 308 is shown, to abut against anterior base portion 309. Posterior base portion includes a slot 357 that contains an O-ring 358. O-ring 358 inhibits or prevents fluid from passing between posterior base portion, 309 and cylinder valve 20. As can be appreciated, the anterior and posterior base; portions can be arranged in other manners. One other non-limiting configuration is illustrated in FIG. 7A. Anterior base portion 308 is shown to have a slot 356 to receive the front end of posterior base portion 309. In this arrangement, the anterior and posterior base portions are press fitted together.

Referring again to FIG. 7, the anterior base portion 309 includes an outer threaded portion 304 for threadedly engaging with threadings 28 in the inner surface of sub-chamber 25 of the cylinder valve. An O-ring 318 is positioned in seal slot 306 in posterior base portion 309. O-ring 318 surrounds an outer periphery of the body member 302 to enhance the sealing engagement between the cylinder valve and the body member. Anterior and posterior base portions 308 and 309 having an opening 310 therethrough. The anterior base portion 308 has an outer surface that defines a seal seat 312 against which a sealing member 360 can be sated. Body member 302 also includes a valve cavity 314, wherein a valve member 320 can move therein. Facing opposite the seal seat on anterior base portion 308 is a biasing abutment 316.

Valve member 320 is at least partially positioned within body member 302. Valve member 320 is slidably positioned in valve cavity 314 of body member 302. A lubricant can be used to facilitate the movement of the valve member in the body member. Valve member 320 includes a central cavity 322 along the longitudinal axis of the valve member. The central cavity begins at docking abutment 324 and terminates at cavity end 332. Positioned adjacent to cavity end 332 are at least one side openings 334. Central cavity 322 includes a tapered edge 336 positioned between docking abutment 324 and cavity end 332. The tapered edge defines the narrowing of the central cavity and divides the cavity between a wider posterior portion 338 and a narrower anterior portion 340. Valve member 320 also includes a biasing abutment surface 342 that faces the flow of the fluid though the valve member. An indent 346 is positioned on the outwardly facing surface 344 of valve member 320. Indent 346 is designed to retain an O-ring 348 to form a sealing arrangement between the outwardly facing surface of the valve member and the inwardly facing surface 315 of the body member. The O-ring facilitates in forming a seal between valve member 320 and body member 302.

Docking abutment 324 includes two faces 326 and 328. Faces 326 and 328 form an angle greater than 90° between the two faces. Face 326 flares outwardly and is adapted to receive nipple 40. A portion of faces 326 and 328 includes a resilient sealer 330 that forms a seal with the nipple when the nipple engages the docking abutment.

Positioned between biasing abutment 316 of the body member and biasing abutment surface 342 of the valve member is a valve biasing member such as spring 350 which continuously urges biasing abutment surface 342 away from biasing abutment 316. The valve biasing member causes the valve member to resist movement in the body member when nipple 40 engages the docking member on the valve member. Valve member 320 has an anterior portion 352 which includes an opening 354 adapted to receive a portion of sealing member 360.

Sealing member 360 includes a slot 362 that retains a sealing ring 364. Sealing member 360 also includes a seal finger 368 which extends from seal abutment surface 366 and through opening 354 of valve member 320. Sealing member 360 includes a biasing seat 374 that is adapted to receive one end of seal spring 380.

The operation of the valve insert disclosed in FIGS. 7 and 8 are similar to the valve insert shown in FIGS. 5 and 6. When male fitting 32 is separated from the cylinder valve, spring 350 exerts a force on valve member 320 thereby urging the biasing abutment surface to move away from biasing abutment as shown in FIG. 8. The valve member in this position results in sealing abutment surface 351 moving off of abutment surface 366 of sealing member 360 thereby allowing sealing ring 364 to form a seal with seal seat 312. Spring 380, positioned between the back wall of sub-chamber 22 and biasing seat 374 on sealing member 360, continuously urges sealing member 360 into engagement with seal seat 312 of body member 302 thereby forming a sealing arrangement between sealing ring 364 on the sealing member and seal seat 312 on the body member. The sealing arrangement between sealing ring 364 and seal seat 312 prevents fluid from flowing through the valve insert.

As shown in FIG. 7, the threaded portion 30 of the cylinder valve matingly engages with the inner threaded portion 38 of a male fitting 32 resulting in nipple 40 engaging docking abutment 324 of valve member 320. When male fitting 32 is screwed onto the cylinder valve, the arcuate side face 42 of nipple 40 hermetically engages resilient sealer 330 on faces 326 and 328 of the docking member. As nipple 40 is continually moved into the body member, spring. 350 continuously exerts a force on the valve member to cause the valve member to resist movement in the body member. This resistance of movement of the valve member causes a seal to be formed and maintained between the nipple and the docking member. As the nipple continues to move into the body member, the force exerted on the valve member becomes greater than the opposing force of the spring, resulting in the valve member beginning to move axially in the body member. As shown in FIG. 7, seal abutment surface 351 is spaced from seal abutment surface 366 of sealing member 360. As a result, the valve member travels a defined distance axially before seal abutment surface 351 contacts seal abutment surface 366. During this movement of the valve member, the compression of spring 350 increases the counter moving force of the valve member, thereby ensuring that a seal is maintained between the nipple and the docking member. Once seal abutment surface 351 contacts seal abutment surface 366, further movement of valve member 320 is resisted by the biasing force acting on sealing member 360 by seal spring 380 and the fluid pressure acting of the sealing member. As the nipple continues to be moved into the body member, the counteracting force of seal spring 380 and the fluid pressure, if any, on the sealing member are overcome and the seal member moves off seal seat 312 to allow fluid to flow through the valve insert.

When male fitting 32 is unscrewed from the cylinder valve, and the nipple is moved out of the body member, the sealing arrangement between the nipple and the docking member is maintained by the biasing forces of both springs 380 and 350. As the valve member moves to its initial position, spring 380 causes the sealing member to move to the closed position. Once the sealing ring 364 contacts seal seat 312 and prevents fluid from flowing through the valve insert, the valve member continues to move to its initial position, and the sealing arrangement between the nipple and docking member is maintained by spring 350 until the nipple is retracted off the docking member. In this valve insert arrangement, the sealing arrangement between the nipple and the docking member is maintained before and after the sealing ring 364 is moved off of or moved on to seal seat 312. As a result, the sealing member forms a seal with little, if any, force being reduced between nipple 40 and docking abutment 324, thereby reducing the occurrence of fluid escape between the nipple and docking member prior to the sealing member forming a seal with the valve insert.

When male fitting 32 is separated from the cylinder valve, spring 350 exerts a force on valve member 320 thereby urging biasing abutment surface 342 to move away from biasing abutment 316. This arrangement is shown in FIG. 8, wherein sealing member 360 is in the closed position. The valve member in this position causes seal ring 364 on seal abutment surface 366 to engage seal abutment surface 312. Sealing member 360 is moved and held in the closed position by the ends of anterior portion 352 engaging retaining ring 372 on seal finger 368 of sealing member 360. As a result of the operation of the valve member, significantly less fluid escapes from cylinder valve 20 as the male fitting 32 is connected to the cylinder valve. The valve insert of the present invention also reduces the amount of fluid escape between cylinder valve 20 and male fitting 32 as the male fitting is removed from the cylinder valve.

Figure 9:
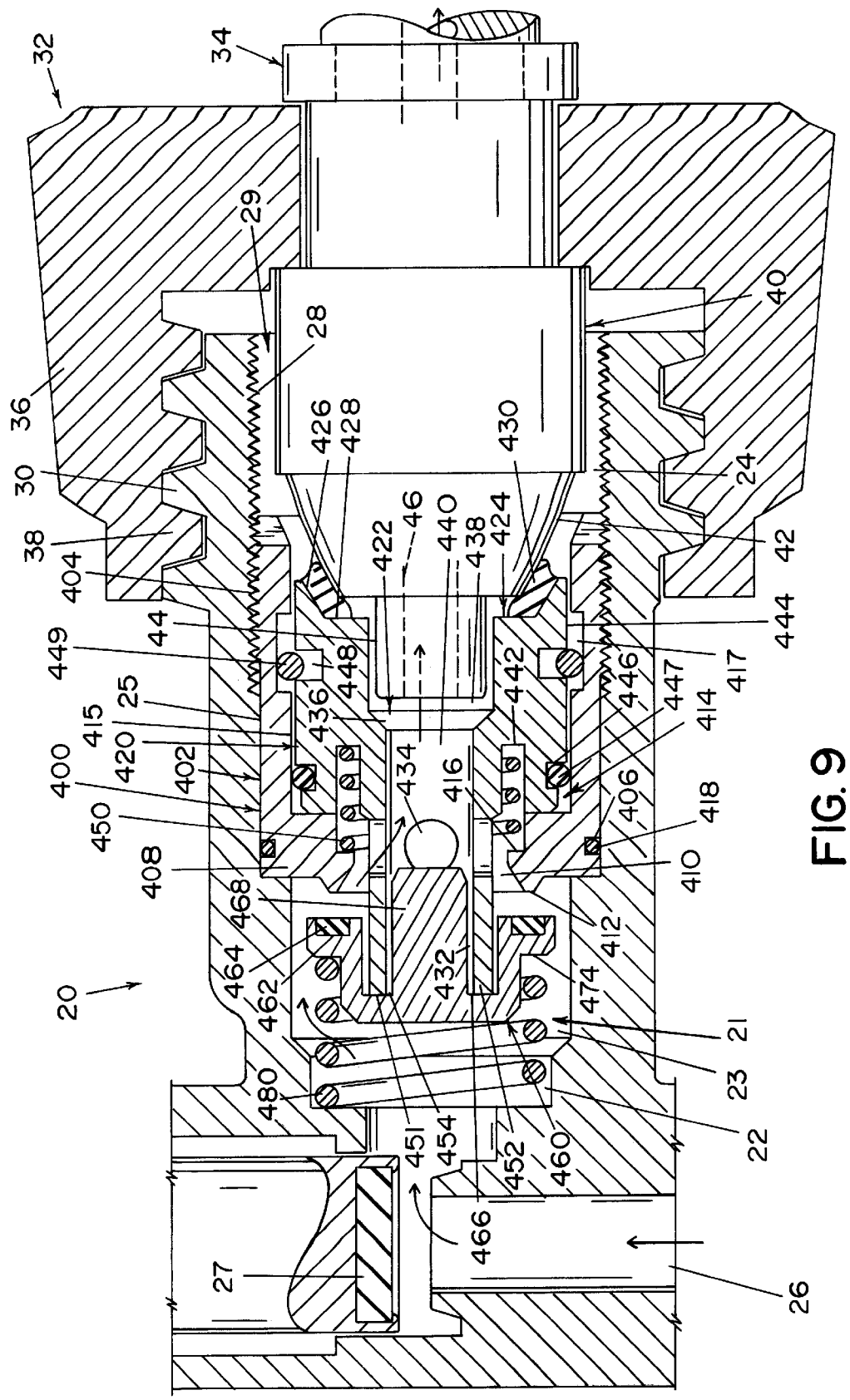
FIG. 9 is an elevational, cross-sectional view showing still another alternative valve insert in accordance with the present invention mounted in a cylinder valve outlet and a male fitting connected to the cylinder valve and engaging the valve insert.
Figure 10:
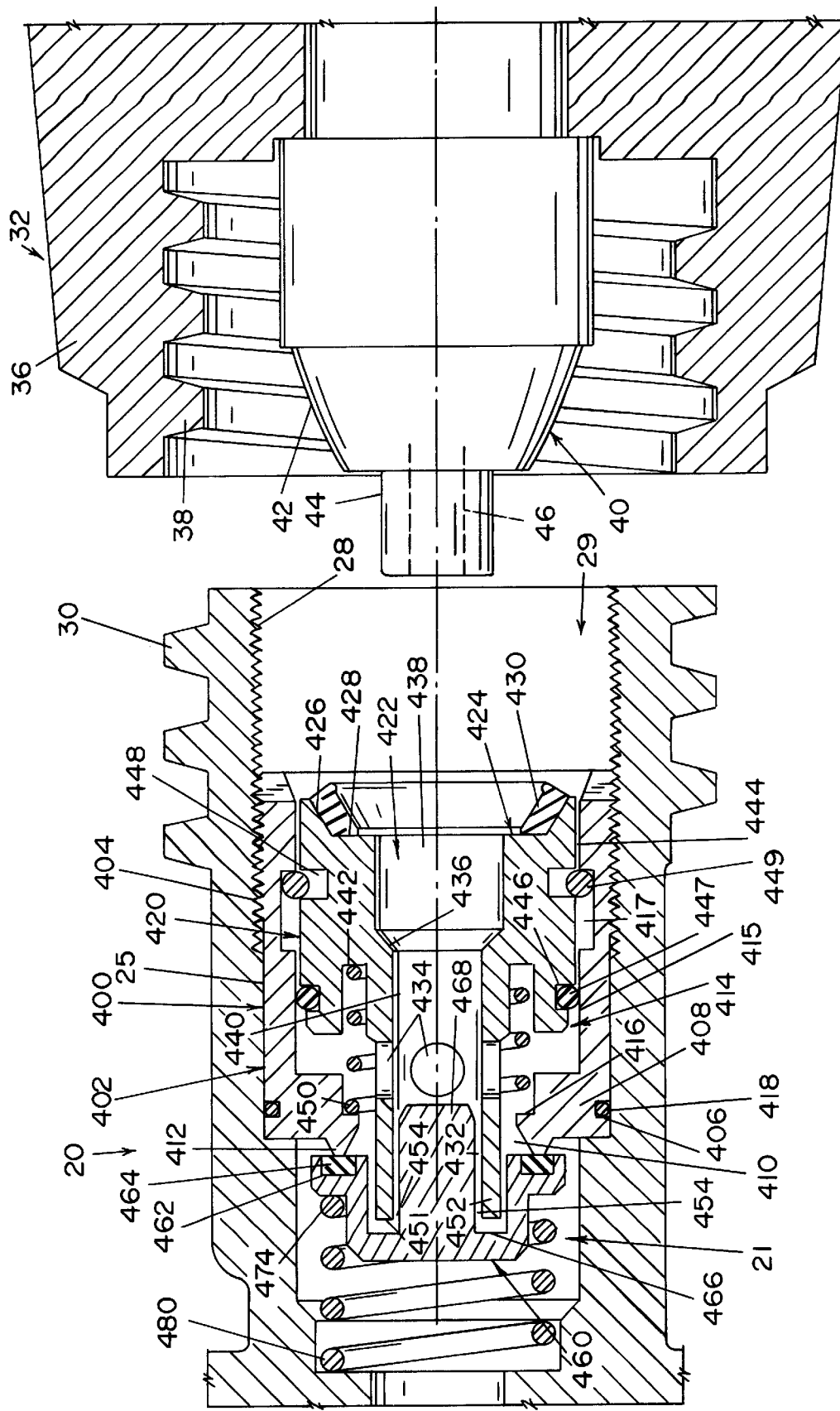
FIG. 10 is an enlarged partial view of FIG. 9 showing the male fitting disengaged from the cylinder valve.

Referring now to FIGS. 9 and 10, still another alternative design of the valve insert is disclosed. The basic design of the valve insert is the same as shown in FIGS. 7 and 8. The design of the male fitting 32 and the cylinder valve 20 remain the same, thus the operation and detailed description of the cylinder valve and male fitting will not be repeated. In addition, similar numbering will be used to refer to the cylinder valve and male fitting as used in FIGS. 1, 2, and 5–8. Valve insert 400 includes a body member 402 which has an outer threaded portion 404 for threadedly engaging with threadings 28 in the inner surface of sub-chamber 25of the cylinder valve. An O-ring 418 is positioned in seal slot 406 in body member 402. O-ring 418 surrounds an outer periphery of the body member 402 to enhance the sealing engagement between the cylinder valve and the body member. Body member 402 includes a base portion 408 having an opening 41 0 therethrough. The base portion 408 has an outer surface that defines a seal seat 412 against which a sealing member 460 can be seated. Body member 402 also includes a valve cavity 414, wherein a valve member 420 can move therein. Facing opposite the seal seat on base portion 408 is a biasing abutment 416. Body member 402 includes a travel slot 417.

Valve member 420 is at least partially positioned within body member 402. Valve member 420 is slidably positioned in valve cavity 414 of body member 402. A lubricant can be used to facilitate the movement of the valve member in the body member. Valve member 420 includes a central cavity 422 along the longitudinal axis of the valve member. The central cavity begins at docking abutment 424 and terminates at cavity end 432. Positioned adjacent to cavity end 432 are at least one side openings 434. Central cavity 422 includes a tapered edge 436 positioned between docking abutment 424 and cavity end 432. The tapered edge defines the narrowing of the central cavity and divides the cavity between a wider posterior portion 438 and a narrower anterior portion 440. Valve member 420 also includes a biasing abutment surface 442 that faces the flow of the fluid though the valve member. An indent 446 is positioned on the outwardly facing surface 444 of valve member 420. Indent 446 is designed to retain an O-ring 447 to form a sealing arrangement between the outwardly facing surface of the valve member and the inwardly facing surface 415 of the body member. The O-ring facilitates in forming a seal between valve member 420 and body member 402. The valve member also includes another indent 448 is positioned on the outwardly facing surface 444 of valve member 420. Indent 448 is designed to retain an O-ring or retaining ring 449 to form another sealing arrangement between the outwardly facing surface of the valve member and the inwardly facing surface 415 of the body member. The O-ring facilitates in forming a seal between valve member 420 and body member 402. The O-ring also travels in travel slot 417 of the body member. The travel slot is sized to limit the range of movement of the valve insert in the body member. O-ring 447 and O-ring or retaining ring 449 also function;to at least partially entrap lubricant, if used, between the O-rings, thereby increasing the time a lubricant, if used, is maintained between the valve insert and the body member.

Docking abutment 424 includes two faces 426 and 428. Paces 426 and 428 form an angle greater than 90° between the two faces. Face 426 flares outwardly and is adapted to receive nipple 40. A portion of faces 426 and 428 includes a resilient sealer 430 that forms a seal with the nipple when the nipple engages the docking abutment.

Positioned between biasing abutment 416 of the body member and biasing abutment surface 442 of the valve member is a valve biasing member such as spring 450 which continuously urges biasing abutment surface 442 away from biasing abutment 416. The valve biasing member causes the valve member to resist movement in the body member when nipple 40 engages the docking member on the valve member. Valve member 420 has an anterior portion 452 which includes an opening 454 adapted to receive a portion of sealing member 460.

Sealing member 460 includes a slot 462 that retains a sealing ring 464. Sealing member 460 also includes a seal finger 468 which extends from seal abutment surface 466 and through opening 454 of valve member 420. Seal finger 468 includes a guide slot 470 that receives anterior portion 452 of the valve insert thereby positioning the sealing member with respect to the end of the valve insert. Sealing member 460 also includes a biasing seat 474 that is adapted to receive one end of seal spring 480.

The operation of the valve insert disclosed in FIGS. 9 and 10 is similar to the valve insert shown in FIGS. 7 and 8. When male fitting 32 is separated from the cylinder valve, spring 450 exerts a force on valve member 420 thereby urging the biasing abutment surface to move away from biasing abutment as shown in FIG. 10. The valve member in this position results in sealing abutment surface 451 moving off of abutment surface 466 of sealing member 460 thereby allowing sealing ring 464 to form a seal with seal seat 412. Spring 480, positioned between the back wall of subchamber 22 and biasing seat 474 on sealing member 460, continuously urges sealing member 460 into engagement with seal seat 412 of body member 402 thereby forming a sealing arrangement between sealing ring 464 on the sealing member and seal seat 412 on the body member. The sealing arrangement between sealing ring 464 and seal seat 412 prevents fluid from flowing. Through the valve insert.

As shown in FIG. 9, the threaded portion 30 of the cylinder valve matingly engages with the inner threaded portion 38 of a male fitting 32 resulting in nipple 40 engaging docking abutment 424 of valve member 420. When male fitting 32 is screwed onto the cylinder valve, the arcuate side face 42 of nipple 40 hermetically engages resilient sealer 430 on faces 426 and 428 of the docking member. As nipple 40 is continually moved into the body member, spring 450 continuously exerts a force on the valve member to cause the valve member to resist movement in the body member. This resistance of movement of the valve member causes a seal to be formed and maintained between the nipple and the docking member. As the nipple continues to move into the body member, the force exerted on the valve member becomes greater than the opposing force of the spring, resulting in the valve member beginning to move axially in the body member. As shown in FIG. 10, seal abutment surface 451 is spaced from seal abutment surface 466 of sealing member 460. As a result, the valve member travels a defined distance laterally before seal abutment surface 451 contacts seal abutment surface 466. During this movement of the valve member, the compression of spring 450 increases the counter moving force of the valve member, thereby ensuring that a seal is maintained between the nipple and the docking member. Once seal abutment surface 451 contacts seal abutment surface 466, further movement of valve member 420 is resisted by the biasing force acting on sealing member 460 by seal spring 480 and the fluid pressure acting of the sealing member. As the nipple continues to be moved into the body member, the counteracting force of seal spring 480 and the fluid pressure, if any, on the sealing member are overcome and the seal member moves off seal seat 412 to allow fluid to flow through the valve insert.

When male fitting 32 is unscrewed from the cylinder valve, and the nipple is moved out of the body member, the sealing arrangement between the nipple and the docking member is maintained by the biasing forces of both springs 480 and 450. As the valve member moves to its initial position, spring 480 causes the sealing member to move to the closed position. Once the sealing ring 464 contacts seal seat 412 and prevents fluid from flowing through the valve insert, the valve member continues to move to its initial position, and the sealing arrangement between the nipple and docking member is maintained by spring 450 until the nipple is retracted off the docking member. In this valve insert arrangement, the sealing arrangement between the nipple and the docking member is maintained before and after the sealing ring 464 is moved off of or moved on to seal seat 412. As a result, the sealing member forms a seal with little, if any, force being reduced between nipple 40 and docking abutment 424, thereby reducing the occurrence of fluid escape between the nipple and docking member prior to the sealing member forming a seal with the valve insert.

When male fitting 32 is separated from the cylinder valve, spring 450 exerts a force on valve member 420 thereby urging biasing abutment surface 442 to move away from biasing. abutment 416. This arrangement is shown in FIG. 10, wherein sealing member 460 is in the closed position. The valve member in this position causes seal ring 464 on seal abutment surface 466 to engage seal abutment surface 412. As a result of the operation of the valve member, significantly less fluid escapes from cylinder valve 20 as the male fitting 32 is connected to the. cylinder valve. The valve insert of the present invention also reduces the amount of fluid escape between cylinder valve 20 and male fitting 32 as the male fitting is removed from the cylinder valve.

Figure 11:
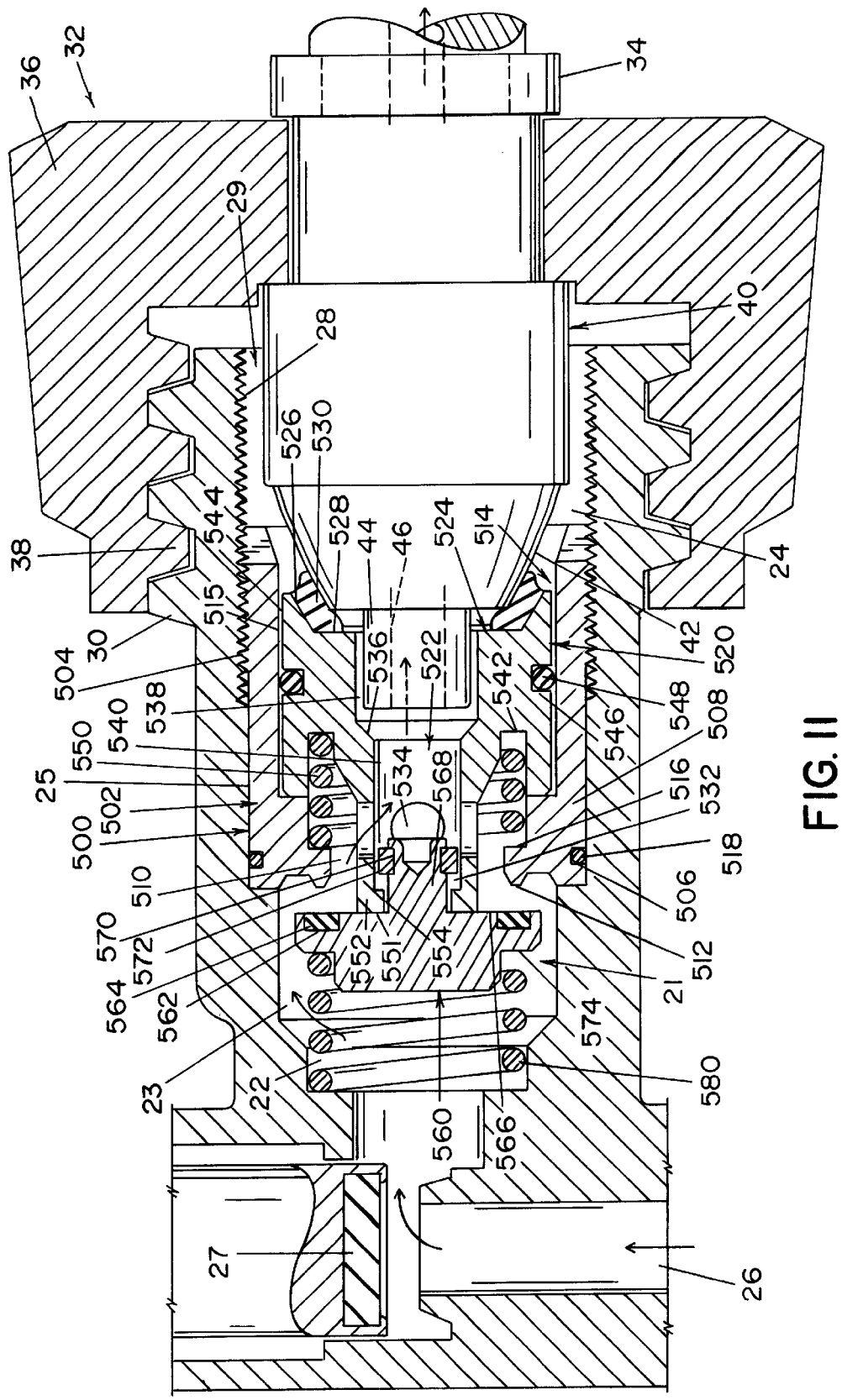
FIG. 11 is an elevational, cross-sectional view showing yet another alternative valve insert in accordance with the present invention mounted in a cylinder valve outlet and a male fitting connected to the cylinder valve and engaging the valve insert; and, FIG. 12 is an enlarged partial view of FIG. 11 showing the male fitting disengaged from the cylinder valve.
Figure 12:
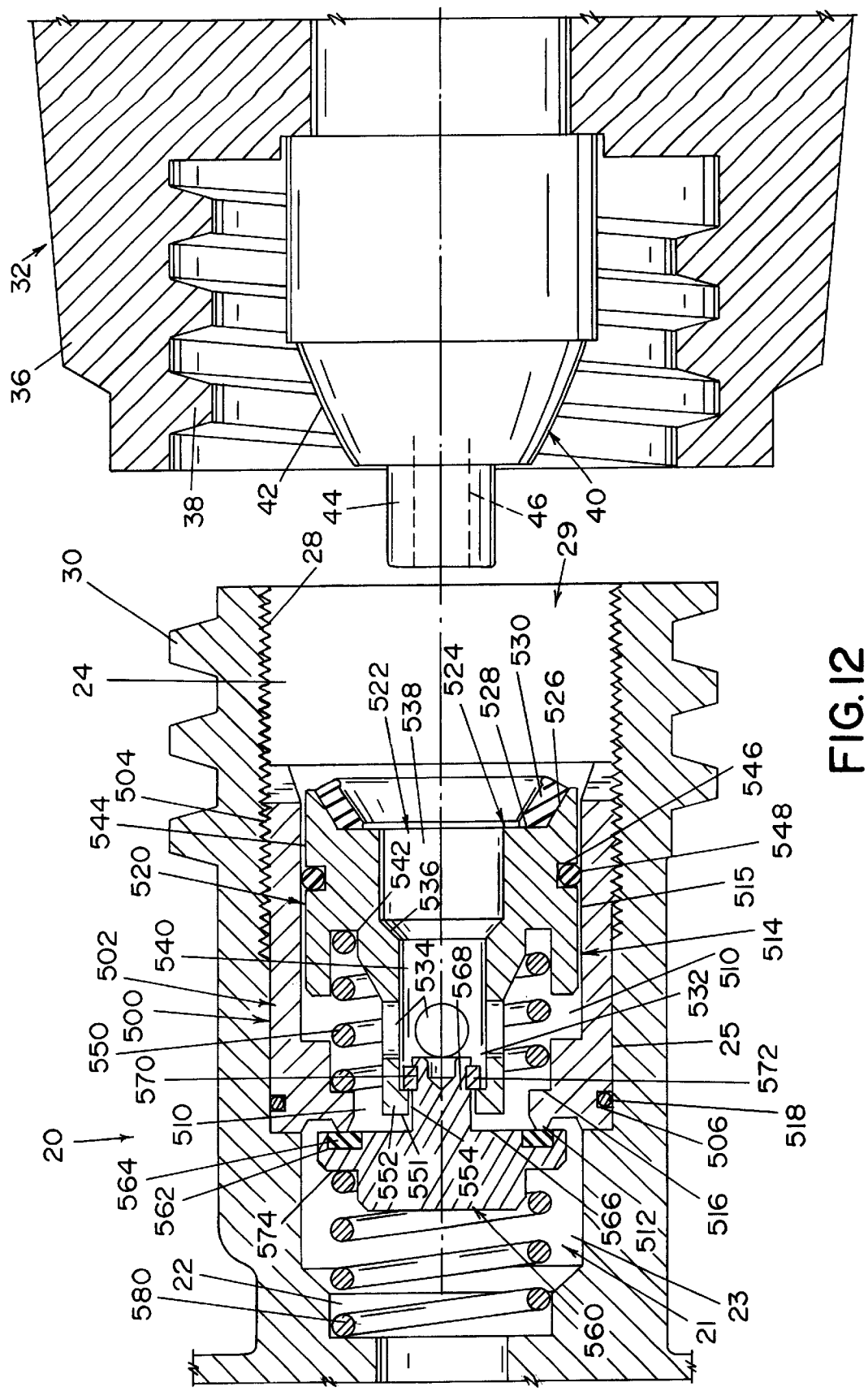

Referring now to FIGS. 11 and 12, a further alternative design of the valve insert is disclosed. The basic design of the valve insert is the same as shown in FIGS. 5 and 6. The design of the male fitting 32 and the cylinder valve 20 remain the same, thus the operation and detailed description of the cylinder valve and male fitting will not be repeated. In addition, similar numbering will be used to refer to the cylinder valve and male fitting as used in FIGS. 5 and 6. Valve insert 500 includes a body member 502 which has an outer threaded portion 504 for threadedly engaging with threadings 28 in the inner surface of sub-chamber 25 of the cylinder valve. An O-ring 518 is positioned in seal slot 506 in body member 502. O-ring 518 surrounds an outer periphery of the body member 502 to enhance the sealing engagement between the cylinder valve and the body member. Body member 502 includes a base portion 508 having an opening 510 therethrough. The base portion 508 has an outer surface that defines a seal seat 512 against which a sealing member 560 can be seated. Body member 502 also includes a valve cavity 514, wherein a valve member 520 can move therein. Facing opposite the seal seat on base portion 508 is a biasing abutment 516.

Valve member 520 is at least partially positioned within body member 502. Valve member 520 is slidably positioned in valve cavity 514 of body member 502. A lubricant can be used to facilitate the movement of the valve member in the body member. Valve member 520 includes a central cavity 522 along the longitudinal axis of the valve member. The central cavity begins at docking abutment 524 and terminates at cavity end 532. Positioned adjacent to cavity end 532 are at least one side openings 534. Central cavity 522 includes a tapered edge 536 positioned between docking abutment 524 and cavity end 532. The tapered edge defines the narrowing of the central cavity and divides the cavity between a wider posterior portion 538 and a narrower anterior portion 540. Valve member 520 also includes a biasing abutment surface 542 that faces the flow of the fluid though the valve member. An indent 546 is positioned on the outwardly facing surface 544 of valve member 520. Indent 546 is designed to retain an O-ring 548 to form a sealing arrangement between the outwardly facing surface of the valve member and the inwardly facing surface 515 of the body member. The O-ring facilitates in forming a seal between valve member 520 and body member 502.

Docking abutment 524 includes two faces 526 and 528. Faces 526 and 528 form an angle greater than 90° between the two faces. Face 526 flares outwardly and is adapted to receive nipple 40. A portion of faces 526 and 528 includes a resilient sealer 530 that forms a seal with the nipple when the nipple engages the docking abutment.

Positioned between biasing abutment 516 of the body member and biasing abutment surface 542 of the valve member is a valve biasing member such as spring 550 which continuously urges biasing abutment surface 542 away from biasing abutment 516. The valve biasing member causes the valve member to resist movement in the body member when nipple 40 engages the docking member on the valve member. Valve member 520 has an anterior portion 552 which includes an opening 554 adapted to receive a portion of sealing member 560.

Sealing member 560 includes a slot 562 that retains a sealing ring 564. Sealing member 560 also includes a seal finger 568 which extends from seal abutment surface 566 and through opening 554 of valve member 520. Seal finger 568 includes a slot 570 that retains a sealing ring 272. Sealing member 560 also includes a biasing seat 574 that is adapted to receive one end of seal spring 580.

The operation of the valve insert disclosed in FIGS. 11 and 12 is similar to the valve insert shown in FIGS. 5 and 6. When male fitting 32 is separated from the cylinder valve, spring 550 exerts a force on valve member 520 thereby urging the biasing abutment surface to move away from biasing abutment as shown in FIG. 12. The valve member in this position results in sealing abutment surface 551 moving off of abutment surface 566 of sealing member 560 thereby allowing sealing ring 564 to form a seal with seal seat 512. Spring 580 positioned between the back wall of sub-chamber 22 and biasing seat 574 on sealing member 560, continuously urges sealing member 560 into engagement with seal seat 512 of body member 502 thereby forming a sealing arrangement between sealing ring 564 on the sealing member and seal seat 512 on the body member. The sealing arrangement between sealing ring 564 and seal seat 512 prevents fluid from flowing through the valve insert. In addition to the sealing arrangement between sealing ring 564 and seal seat 512, a secondary sealing arrangement is formed between seal 572 in the sealing member and the anterior portion 552 of the valve insert. Seal ring 572 also limits the movement of the valve member in the body member.

As shown in FIG. 11, the threaded portion 30 of the cylinder valve matingly engages with the inner threaded portion 38 of a male fitting 32 resulting in nipple 40 engaging docking abutment 524 of valve member 520. When male fitting 32 is screwed onto the cylinder valve, the arcuate side face 42 of nipple 40 hermetically engages resilient sealer 530 on faces 526 and 528 of the docking member. As nipple 40 is continually moved into the body member, spring 550 continuously exerts a force on the valve member to cause the valve member to resist movement in the body member. This resistance of movement of the valve member causes a seal to be formed and maintained between the nipple and the docking member. As the nipple continues to move into the body member, the force exerted on the valve member becomes greater than the opposing force of the spring, resulting in the valve member beginning to move axially in the body member. As shown in FIG. 12, seal abutment surface 551 is spaced from seal abutment surface 566 of sealing member 560. As a result, the valve member travels a defined distance axially before seal abutment surface 551 contacts seal abutment surface 566. During this movement of the valve member, the compression of spring 550 increases the counter moving force of the valve member, thereby ensuring that a seal is maintained between the nipple and the docking member. In addition, the seal arrangement formed between the seal ring 572 and anterior portion 552 is broken. Once seal abutment surface 551 contacts seal abutment surface 566, further movement of valve member 520 is resisted by the biasing force acting on sealing member 560 by seal spring 580 and the fluid pressure acting of the sealing member. As the nipple continues to be moved into the body member, the counteracting force of seal spring 580 and the fluid pressure, if any, on the sealing member are overcome and the seal member moves off seal seat 512 to allow fluid to flow through the valve insert.

When male fitting 32 is unscrewed from the cylinder valve, and the nipple is moved out of the body member, the sealing arrangement between the nipple ad the docking member is maintained by the biasing forces of both springs 580 and 550. As the valve member moves to its initial position, spring 580 causes the sealing member to move to the closed position. Once the sealing ring 564 contacts seal seat 512 and prevents fluid from flowing through the valve insert, the valve member continues to move to its initial position, and the sealing arrangement between the nipple and docking member is maintained by spring 550 until the nipple is retracted off the docking member. In this valve insert arrangement, the sealing arrangement between the nipple and the docking member is maintained before and after the sealing ring 564 is moved off of or moved on to seal seat 512. As a result, the sealing member forms a seal with little, if any, force being reduced between nipple 40 and docking abutment 524, thereby reducing the occurrence of fluid escape between the nipple and docking member prior to the sealing member forming a seal with the valve insert.

When male fitting 32 is separated from the cylinder valve, spring 550 exerts a force on valve member 520 thereby urging biasing abutment surface 542 to move away from biasing abutment 516. This arrangement is shown in FIG. 12, wherein sealing member 560 is in the closed position. The valve member in this position causes seal ring 564 on seal abutment surface 566 to engage seal abutment surface 512. Sealing member 560 is moved and held in the closed position by the ends of anterior portion 552 engaging seal ring 572 on seal finger 568 of sealing member 560. The contact between seal ring 572 and anterior portion 552 forms a secondary seal. As a result of the operation of the valve member, significantly less fluid escapes from cylinder valve 20 as the male fitting 32 is connected to the cylinder valve. The valve insert of the present invention also reduces the amount of fluid escape between cylinder valve 20 and male fitting 32 as the male fitting is removed from the cylinder valve.

The present invention contemplates that many changes and modifications may be made. For example, the materials of construction are not deemed to be critical, and may be varied as desired. Similarly, the particular structure of the individual component parts of the valve insert, body member, sealing member, the docking member, and the like, may be changed as needed.

The male section may communicate with a device to be fueled (e.g., a gas grill). Alternatively, the male section may communicate with a source such that the cylinder may be refilled through the outlet of the cylinder valve. One unique feature of the invention is that the improved insert may be readily used with cylinder valves to incorporate the fluid-tight sealing advantages of the insert. While the improved insert has been shown and described in the environment of a cylinder valve, it is readily apparent that the insert could be used in other types of coupling and valves as well.

The invention has been described with reference to a preferred embodiment and alternates thereof. It is believed that many modifications and alterations to the embodiments disclosed will readily suggest itself to the those skilled in the art upon reading and understanding the detailed description of the invention. It is intended to include all such modifications and alterations insofar as they come within the scope of the present invention.

We claim:

1. A valve insert adapted to be at least partially in a first fluid conduit to enable a flow of fluid therethrough when a second fluid conduit is sufficiently engaged therewith and to prevent such fluid flow when the two fluid conduits are sufficiently separated from one another comprising:

body member adapted to be at least partially positioned in said first fluid conduit, said body member including a valve cavity, an opening through which fluid may flow therethrough, a seal seat at least partially surrounding said opening and facing toward the normal direction of fluid flow, an abutment surface facing away from the normal direction of fluid flow, and an inwardly-facing surface;

a valve member at least partially positioned in said valve cavity and at least partially movable in said valve cavity, said valve member having an abutment surface at least partially facing said body member abutment surface, a docking member adapted to contact at least portion of said second fluid conduit, and a seal contact surface;

valve biasing member positioned between at least a portion of said body member and at least a portion of said valve member, said valve biasing member exerting a force to urge said abutment surface of said valve member to move away from said body member abutment surface; and a seal member adapted to form a sealing engagement with said seal seat of said body member;

whereby when said first and second fluid conduits are sufficiently engaged with one another, at least a portion of said second fluid conduit forms a sealing engagement with said docking member prior to breaking the seal between said seal member and said seal seat, and said valve member and said seal member having lost motion therebetween.

2. The valve insert as defined in claim 1, wherein said breaking the seal between said seal member and said seal seat forms an orifice through which fluid can flow.

3. The valve insert as defined in claim 2, wherein said valve member is movable relative to said body member between a first position at which the area of said orifice is substantially zero, a second position at which the area of said orifice is substantially zero, and a third position at which the area of said orifice is a non-zero value.

4. The valve insert as defined in claim 2, wherein a movement of said seal member relative to said seal seat forms a variable area orifice.

5. The valve insert as defined in claim 3, wherein a movement of said seal member relative to said seal seat forms a variable area orifice.

6. The valve insert as defied in claim 1, wherein said valve member includes an outwardly-facing surface arranged to at least partially slidably engage said inwardly-facing surface of said body member.

7. The valve insert as defined in claim 5, wherein said valve member includes an outwardly-facing surface arranged to at least partially slidably engage said inwardly-facing surface of said body member.

8. The valve insert as defined in claim 6, including at least one sealing device positioned at least partially between said inwardly-facing surface of said body member and said outwardly-facing surface of said valve member.

9. The valve insert as defined in claim 7, including at least one sealing device positioned at least partially between said inwardly-facing surface of said body member and said outwardly-facing surface of said valve member.

10. The valve insert as defined in claim 1, wherein a pressure differential across said valve insert urges said docking member into a sealing engagement with at least a portion of said second fluid conduit independent of the specific position of said valve member relative to said body member when said first and second fluid conduits are sufficiently engaged with one another.

11. The valve insert as defined in claim 9, wherein a pressure differential across said valve insert urges said docking member into a sealing engagement with at least a portion of said second fluid conduit independent of the specific position of said valve member relative to said body member when said first and second fluid conduits are sufficiently engaged with one another.

12. The valve insert as defined in claim 1, wherein a docking member includes a sleeve that defines a tapered portion flaring from the center of said docking member and facing away from the normal direction of fluid flow.

13. The valve insert as defined in claim 11, wherein a docking member includes a sleeve that defines a tapered portion flaring from the center of said docking member and facing away from the normal direction of fluid flow.

14. The valve insert as defined in claim 12, said second fluid conduit having a nipple that has an arcuate side face and an end face, said arcuate side face of said nipple adapted to engage said tapered portion of said docking member prior to said nipple urging said valve member to move in said body member.

15. The valve insert as defined in claim 13, said second fluid conduit having a nipple that has an arcuate side face and an end face, said arcuate side face of said nipple adapted to engage said tapered portion of said docking member prior to said nipple urging said valve member to move in said body member.

16. The valve insert as defined in claim 14, wherein said second fluid conduit includes a POL nipple adapted to contact at least a portion of said docking member.

17. The valve insert as defined in claim 15, wherein said second fluid conduit includes a POL nipple adapted to contact at least a portion of said docking member.

18. The valve insert as defined in claim 1, including seal biasing member adapted to urge said seal member toward said seal seat.

19. The valve insert as defined in claim 11, including a seal biasing member adapted to urge said seal member toward said seal seat.

20. The valve insert as defined in claim 18, wherein said seal biasing member engages said seal member.

21. The valve insert as defined in claim 19, wherein said seal biasing member engages said seal member.

22. The valve insert as defined in claim 18, wherein one end of the seal biasing member engages a portion of the first fluid conduit.

23. The valve insert as defined in claim 21, wherein one end of the seal biasing member engages a portion of the first fluid conduit.

24. The valve insert as defined in claim 18, wherein said valve biasing member and said seal biasing member includes springs.

25. The valve insert as defined in claim 19, wherein said valve biasing member and said seal biasing member includes springs.

26. The valve insert as defined in claim 1, wherein said valve insert is removably mounted to said first fluid conduit.

27. The valve insert as defined in claim 17, wherein said valve insert is removably mounted to said first fluid conduit.

28. The valve insert as defined in claim 1, wherein said valve member includes a cup-shaped member having a side wall and a bottom, and wherein slots extend radially through said side wall adjacent said bottom.

29. The valve insert as defined in claim 27, wherein said valve-member includes a cup-shaped member having a side wall and a bottom, and wherein a plurality of slots extend radially through said side wall adjacent said bottom.

30. The valve insert as defined in claim 1, wherein an exterior of said body member has a substantially cylindrical shape.

31. The valve insert as defined in claim 29, wherein an exterior of said body member has a substantially cylindrical shape.

32. The valve insert as defined in claim 1, including a coupling arrangement to connect said first and second conduits.

33. The valve insert as defined in claim 31, including a coupling arrangement to connect said first and second conduits.

34. The valve insert as defined in claim 1, wherein said first fluid conduit is substantially tubular and has an internally-threaded position, wherein said body member having an externally-threaded portion matingly engages said internally-threaded portion.

35. The valve insert as defined in claim 33, wherein said first fluid conduit is substantial tubular has an internally-threaded portion, wherein said body member having an externally-threaded portion matingly engages said internally-threaded portion.

36. The valve insert as defined in claim 34, wherein said first fluid conduit is the outlet of a cylinder valve.

37. The valve insert defined in claim 35, wherein said first fluid conduit is the outlet of a cylinder valve.

38. A valve insert adapted to be at least partially positioned in a first fluid conduit to enable a flow of fluid therethrough when a second fluid conduit is sufficiently engaged therewith and to prevent such fluid flow when the two fluid conduits are sufficiently separated from one another, comprising:
  a body member adapted to be at least partially positioned in said first fluid conduit, said body member including a valve cavity, an opening through which fluid may flow therethrough, a seal seat at least partially surrounding said opening and facing toward the normal direction of fluid flow, an abutment surface facing away from the normal direction of fluid flow, and an inwardly-facing surface;
  a valve member at least partially positioned in said valve cavity and at least partially movable in said valve cavity, said valve member having an abutment surface at least partially facing said body member abutment surface, a docking member adapted to contact at least a portion of said second fluid conduit, and a seal contact surface;
  a seal member adapted to form a sealing engagement with said seal seat of said body member;
  whereby when said first and second fluid conduits are sufficiently engaged with one another, at least a portion of said second fluid conduit forms a sealing engagement with said docking member prior to breaking the seal between said seal member and said seal seat said valve member is movable relative to said body member between a first position at which the area of said orifice is substantially zero, a second position at which the area of said orifice is substantially zero, and a third position at which the area of said orifice is a non-zero value.

39. The valve insert as defined in claim 38, including a valve biasing member positioned between at least a portion of said body member and at least a portion of said valve member, said valve biasing member at least partially resisting movement of said valve member relative to said body member when said second fluid conduit contacts said docking member.

40. The valve insert as defined in claim 39, wherein said valve biasing member exerts a force to urge said abutment surface of said valve member to move away from said abutment surface of said body member.

41. The valve insert as defined in claim 39, wherein said valve biasing member includes a spring.

42. The valve insert as defined in claim 40, wherein said valve biasing member includes a spring.

43. The valve insert as defined in claim 38, wherein said breaking the seal between said seal member and said seal seat forms an orifice through which fluid can flow.

44. The valve insert as defined in claim 42, wherein said breaking the seal between said seal member and said seal seat forms an orifice through which fluid can flow.

45. The valve insert as defined in claim 43, wherein a movement of said seal member relative to said seal seat forms a variable area orifice.

46. The valve insert as defined in claim 44, wherein a movement of said seal member relative to said seal seat forms a variable area orifice.

47. The valve insert as defined in claim 38, wherein said valve member includes an outwardly-facing surface arranged to at least partially slidably engage said inwardly-facing surface of said body member.

48. The valve insert as defined in claim 46, wherein said valve member includes an outwardly-facing surface arranged to at least partially slidably engage said inwardly-facing surface of said body member.

49. The valve insert as defined in claim 47, including at least one sealing device positioned at least partially between said inwardly-facing surface of said body member and said outwardly-facing surface of said valve member.

50. The valve insert as defined in claim 48, including at least one sealing device positioned at least partially between said inwardly-facing surface of said body member and said outwardly-facing surface of said valve member.

51. The valve insert as defined in claim 38, wherein a pressure differential across said valve insert urges said docking member into a sealing engagement with at least a portion of said second fluid conduit independent of the specific position of said valve member relative to said body member when said first and second fluid conduits are sufficiently engaged with one another.

52. The valve insert as defined in claim 50, wherein a pressure differential across said valve insert urges said docking member into a sealing engagement with at least a portion of said second fluid conduit independent of the specific position of said valve member relative to said body member when said first and second fluid conduits are sufficiently engaged with one another.

53. The valve insert as defined claim 38, wherein a docking member includes a sleeve that defines a tapered portions flaring from the center of said docking member and facing away from the normal direction of fluid flow.

54. The valve insert as defined in claim 52, wherein a docking member includes a sleeve that defines a tapered portion flaring from the center of said docking member and facing away from the normal direction of fluid flow.

55. The valve insert as defined in claim 53, said second fluid conduit having a nipple that has an arcuate side face and an end face, said arcuate side face of said nipple adapted to engage said tapered portion of said docking member prior to said nipple urging said valve member to move in said body member.

56. The valve insert as defined in claim 54, said second fluid conduit having a nipple that has an arcuate side face and an end face, said arcuate side face of said nipple adapted to engage said tapered portion of said docking member prior to said nipple urging said valve member to move in said body member.

57. The valve insert as defined in claim 55, wherein said second fluid conduit includes a POL nipple adapted to contact at least a portion of said docking member.

58. The valve insert as defined in claim 56, wherein said second fluid conduit includes a POL nipple adapted to contact at least a portion of said docking member.

59. The valve insert as defined in claim 38, including a seal biasing member adapted to urge said seal member toward said seal seat.

60. The valve insert as defined in claim 58, including a seal biasing member adapted to urge said seal member toward said seal seat.

61. The valve insert as defined in claim 59, wherein said seal biasing member engages said seal member.

62. The valve insert as defined in claim 60, wherein said seal biasing member engages said seal member.

63. The valve insert as defined in claim 59, wherein one end of the seal biasing member engages a portion of the first fluid conduit.

64. The valve insert as defined in claim 62, wherein one end of the seal biasing member engages a portion of the first fluid conduit.

65. The valve insert as defined in claim 59, wherein said valve biasing member and said seal biasing member includes springs.

66. The valve insert as defined in claim 64, wherein said valve biasing member and said seal biasing member includes springs.

67. The valve insert as defined in claim 38, wherein said valve insert is removably mounted to said first fluid conduit.

68. The valve insert as defined in claim 66, wherein said valve insert is removably mounted to said first fluid conduit.

69. The valve insert as defined in claim 38, wherein said valve member includes a cup-shaped member having a side wall and a bottom, and wherein a plurality of slots extend radially through said side wall adjacent said bottom.

70. The valve insert as defined claim 68, wherein said valve member includes a cup-shaped member having a side wall and a bottom, and wherein a plurality of slots extend radially through said side wall adjacent said bottom.

71. The valve insert as defined in claim 38, wherein an exterior of said body member has a substantially cylindrical shape.

72. The valve insert as defined in claim 70, wherein an exterior of said body member has a substantially cylindrical shape.

73. The valve insert as defined in claim 38, including a coupling arrangement to connect said first and second conduits.

74. The valve insert as defined in claim 72, including a coupling arrangement to connect said first and second conduits.

75. The valve insert as defined in claim 38, wherein said first fluid conduit is substantially tubular and has an internally-threaded portion, wherein said body member having an externally-threaded portion matingly engages said internally-threaded portion.

76. The valve insert as defined in claim 74, wherein first fluid conduit is substantially tubular and has an internally-threaded portion, wherein said body member having an externally-threaded portion matingly engages said internally-threaded portion.

77. The valve insert as defined in claim 34, wherein said first conduit is the outlet of a cylinder valve.

78. The valve insert as defined in claim 76, wherein said first fluid conduit is the outlet of a cylinder valve.

* * * * *